(12) United States Patent
Moloney

(10) Patent No.: US 12,131,536 B2
(45) Date of Patent: Oct. 29, 2024

(54) VIDEO SURVEILLANCE WITH NEURAL NETWORKS

(71) Applicant: Movidius Limited, Schiphol-Rijk (NL)

(72) Inventor: David Moloney, Dublin (IE)

(73) Assignee: Movidius Ltd., Schiphol-Rijk (NL)

( * ) Notice: Subject to any disclaimer, the term of this patent is extended or adjusted under 35 U.S.C. 154(b) by 0 days.

(21) Appl. No.: 17/896,856

(22) Filed: Aug. 26, 2022

(65) Prior Publication Data

US 2023/0056418 A1    Feb. 23, 2023

Related U.S. Application Data

(63) Continuation of application No. 16/028,095, filed on Jul. 5, 2018, now Pat. No. 11,430,312.

(51) Int. Cl.
*G06V 20/40* (2022.01)
*G06N 3/08* (2023.01)
(Continued)

(52) U.S. Cl.
CPC .............. *G06V 20/40* (2022.01); *G06N 3/08* (2013.01); *G06V 10/82* (2022.01); *G06V 20/52* (2022.01);
(Continued)

(58) Field of Classification Search
None
See application file for complete search history.

(56) References Cited

U.S. PATENT DOCUMENTS 9,280,742 B1 *   3/2016   Sargin ..................... G11B 27/28
9,990,687 B1 *   6/2018   Kaufhold ........... H04N 1/32267
(Continued)

FOREIGN PATENT DOCUMENTS

CN    105844665 A    8/2016
CN    108174165 A    6/2018
(Continued)

OTHER PUBLICATIONS

International Searching Authority, "International Preliminary Report on Patentability," issued in connection with International Patent Application No. PCT/EP2019/068085, issued on Jan. 5, 2021, 9 pages.
(Continued)

*Primary Examiner* — Ricky Chin
(74) *Attorney, Agent, or Firm* — Hanley, Flight & Zimmerman, LLC

(57) ABSTRACT

Example methods, apparatus, systems and articles of manufacture (e.g., physical storage media) to implement video surveillance with neural networks are disclosed. Example systems disclosed herein include a database to store records of operator-labeled video segments (e.g., as records of operator-labeled video segments). The operator-labeled video segments include reference video segments and corresponding reference event labels describing the video segments. Disclosed example systems also include a neural network including a first instance of an inference engine, and a training engine to train the first instance of the inference engine based on a training set of the operator-labeled video segments obtained from the database, the first instance of the inference engine to infer events from the operator-labeled video segments included in the training set. Disclosed example systems further include a second instance of the inference engine to infer events from monitored video feeds, the second instance of the inference engine being based on the first instance of the inference engine.

21 Claims, 11 Drawing Sheets

(51) Int. Cl.
    *G06V 10/44*      (2022.01)
    *G06V 10/82*      (2022.01)
    *G06V 20/52*      (2022.01)
    *G08B 13/196*     (2006.01)
(52) U.S. Cl.
    CPC .  *G08B 13/19615* (2013.01); *G08B 13/19671* (2013.01); *G08B 13/19682* (2013.01); *G06V 10/454* (2022.01); *G06V 20/44* (2022.01)

(56)  References Cited

U.S. PATENT DOCUMENTS

| | | | | |
|---|---|---|---|---|
| 10,430,662 | B2* | 10/2019 | Katz | G06Q 30/0242 |
| 10,924,800 | B2 | 2/2021 | Song et al. | |
| 11,423,517 | B2 | 8/2022 | Moloney | |
| 11,430,312 | B2* | 8/2022 | Moloney | G06N 3/08 |
| 11,514,188 | B1* | 11/2022 | Jassal | G06F 21/6245 |
| 11,625,910 | B2 | 4/2023 | Moloney et al. | |
| 2011/0040754 | A1* | 2/2011 | Peto | G06F 40/117 |
| | | | | 707/736 |
| 2012/0221508 | A1* | 8/2012 | Chaturvedi | G06F 16/215 |
| | | | | 707/602 |
| 2012/0288186 | A1* | 11/2012 | Kohli | G06V 10/772 |
| | | | | 382/159 |
| 2014/0314310 | A1* | 10/2014 | Movellan | G06N 20/00 |
| | | | | 382/155 |
| 2015/0324686 | A1 | 11/2015 | Julian et al. | |
| 2015/0347908 | A1* | 12/2015 | Mathew | G06N 5/04 |
| | | | | 706/12 |
| 2016/0070962 | A1* | 3/2016 | Shetty | G06V 20/46 |
| | | | | 382/225 |
| 2016/0328384 | A1* | 11/2016 | Divakaran | G06F 40/211 |
| 2017/0339178 | A1 | 11/2017 | Mahaffey et al. | |
| 2017/0364733 | A1* | 12/2017 | Estrada | G06V 20/13 |
| 2018/0012110 | A1* | 1/2018 | Souche | G06V 10/454 |
| 2018/0032917 | A1 | 2/2018 | Hagen et al. | |
| 2018/0046475 | A1* | 2/2018 | Wei | G06F 9/44552 |
| 2018/0060722 | A1 | 3/2018 | Hwang et al. | |
| 2018/0114334 | A1* | 4/2018 | Desai | G06V 10/82 |
| 2018/0121738 | A1* | 5/2018 | Womack | H04N 21/2541 |
| 2018/0176661 | A1* | 6/2018 | Varndell | H04N 21/2187 |
| 2018/0240031 | A1* | 8/2018 | Huszar | G06N 3/045 |
| 2018/0260651 | A1* | 9/2018 | Wang | G06V 20/56 |
| 2018/0293442 | A1* | 10/2018 | Fridental | G06V 10/776 |
| 2018/0322371 | A1* | 11/2018 | Dupont De Dinechin | |
| | | | | G06V 10/454 |
| 2018/0357286 | A1* | 12/2018 | Wang | G06F 16/3329 |
| 2018/0373980 | A1* | 12/2018 | Huval | G06F 18/41 |
| 2018/0374105 | A1 | 12/2018 | Azout et al. | |
| 2019/0065864 | A1* | 2/2019 | Yu | G06V 10/764 |
| 2019/0095715 | A1* | 3/2019 | Nunes | G06V 20/00 |
| 2019/0180358 | A1* | 6/2019 | Nandan | G06F 18/2113 |
| 2019/0223728 | A1* | 7/2019 | Heidari | G06V 10/82 |
| 2019/0266439 | A1* | 8/2019 | Nien | G06T 7/74 |
| 2019/0272433 | A1* | 9/2019 | Yu | G06V 10/44 |
| 2019/0354744 | A1* | 11/2019 | Chaloux | G06F 40/279 |
| 2019/0392318 | A1* | 12/2019 | Ghafoor | G06V 10/774 |
| 2020/0013265 | A1* | 1/2020 | Moloney | G08B 13/19682 |
| 2020/0184227 | A1* | 6/2020 | Felhi | G06V 40/50 |
| 2020/0257908 | A1* | 8/2020 | Boue | G06V 20/58 |
| 2020/0258616 | A1* | 8/2020 | Likosky | H04N 21/439 |
| 2020/0265255 | A1 | 8/2020 | Li et al. | |
| 2020/0364894 | A1 | 11/2020 | Akhil | |
| 2020/0397346 | A1* | 12/2020 | Nakajima | G01D 9/00 |
| 2020/0410287 | A1* | 12/2020 | Chu | G06F 18/24 |
| 2021/0034819 | A1* | 2/2021 | Wang | G06F 16/355 |
| 2021/0287080 | A1 | 9/2021 | Moloney | |
| 2022/0132222 | A1* | 4/2022 | Zeiler | H04N 21/482 |
| 2023/0010085 | A1* | 1/2023 | Wang | H04L 1/248 |
| 2023/0034382 | A1* | 2/2023 | Kurata | G06V 10/54 |
| 2023/0056418 | A1* | 2/2023 | Moloney | G06V 20/52 |

FOREIGN PATENT DOCUMENTS

| | | |
|---|---|---|
| CN | 108229285 A | 6/2018 |
| CN | 108230358 A | 6/2018 |
| CN | 108230359 A | 6/2018 |
| JP | 2006-252091 A | 9/2006 |
| JP | 2016191973 A | 11/2016 |
| JP | 2017028688 A | 2/2017 |
| JP | 2017-225122 A | 12/2017 |
| JP | 2018072881 A | 5/2018 |
| WO | 2005101346 A1 | 10/2005 |
| WO | 2020008025 A1 | 1/2020 |

OTHER PUBLICATIONS

Japanese Patent Office, "Notice of Reasons for Refusal," issued in connection with Japanese Patent Application No. 2020-572377, mailed on Aug. 15, 2023, 8 pages. [English Translation Included].
China National Intellectual Property Administration, "First Office Action," issued in connection with Chinese Patent Application No. 201980045392.4, dated Oct. 12, 2023, 18 pages. [English Machine Translation].
Eyes of Things, "EoT Device with Factor Form Board," The EoT Consortium, 2016, 57 pages.
Eyes of Things, "EoT Module Product Brief," The EoT Consortium, 2018, 2 pages. Retrieved from <eyesofthings.eu/>.
Gan et al., "DevNet: A Deep Event Network for Multimedia Event Detection and Evidence Recounting," Computer Vision Foundation, 2015, pp. 2568-2577, 10 pages.
Teng et al., "ClickBAIT: Click-based Accelerated Incremental Training of Convolutional Neural Networks," Cornell University, accessed from https://arxiv.org/abs/1709.05021, Sep. 15, 2017, 11 pages.
International Searching Authority, "International Search Report and Written Opinion," mailed in connection with International Patent Application No. PCT/EP2019/068085, on Sep. 6, 2019, 14 pages.
United States Patent and Trademark Office, "Final Rejection," in connection with U.S. Appl. No. 15/914,854, issued Feb. 3, 2023, 21 pages.
United States Patent and Trademark Office, "Non-Final Rejection," in connection with U.S. Appl. No. 16/028,095, issued Jun. 21, 2021, 15 pages.
United States Patent and Trademark Office, "Final Rejection," in connection with U.S. Appl. No. 16/028,095, issued Jan. 25, 2022, 19 pages.
United States Patent and Trademark Office, "Advisory Action (PTOL-303)," in connection with U.S. Appl. No. 16/028,095, issued Apr. 5, 2022, 3 pages.
United States Patent and Trademark Office, "Notice of Allowance and Fee(s) Due," in connection with U.S. Appl. No. 16/028,095, issued May 4, 2022, 7 pages.
United States Patent and Trademark Office, "Non-Final Rejection," in connection with U.S. Appl. No. 17/887,998, issued Dec. 8, 2022, 17 pages.
Japanese Patent Office, "Decision to Grant a Patent," issued in connection with Japanese Patent Application No. 2020-572377, dated Nov. 28, 2023, 5 pages. (English translation included).
Japanese Patent Office, "Notice of Reasons for Refusal," issued in connection with Japanese Patent Application No. 2023-193389, dated Jun. 11, 2024, 7 pages. (English translation included).
Japanese Patent Office, "Notice of Reasons for Refusal," issued in connection with Japanese Patent Application No. 2023-193389, dated Jun. 11, 2024, 7 pages. (English translation included.) (Resubmitted to support the submission of the foreign patent documents cited in this information disclosure statement.).
Japanese Patent Office, "Decision to Grant a Patent," issued in connection with Japanese Patent Application No. 2023-193389, dated Aug. 20, 2024, 5 pages. [English Translation Included].

* cited by examiner

VIDEO SURVEILLANCE WITH NEURAL NETWORKS

RELATED APPLICATION(S)

This patent arises from a continuation of U.S. patent application Ser. No. 16/028,095 (now U.S. Pat. No. 11,430, 312), which is titled "VIDEO SURVEILLANCE WITH NEURAL NETWORKS," and which was filed on Jul. 5, 2018. Priority to U.S. patent application Ser. No. 16/028,095 is claimed. U.S. patent application Ser. No. 16/028,095 is hereby incorporated herein by reference in its entirety.

FIELD OF THE DISCLOSURE

This disclosure relates generally to video surveillance and, more particularly, to video surveillance with neural networks.

BACKGROUND

Traditionally, video surveillance systems have been used by larger institutions, such as large commercial enterprises, government offices, education institutions, etc., for security monitoring. Such video surveillance systems typically employ video cameras to cover the area(s) to be monitored and provide video feeds back to a central monitoring facility, such as a security office. The central monitoring facility typically includes one or more monitoring stations manned by one or more human operators, who view the monitored video feeds and flag events of interest. In some examples, the monitoring stations allow the human operators to log the events of interest and take appropriate remedial action, such as initiating an alarm, contacting first response personnel, etc.

More recently, as the cost of video surveillance cameras has decreased, the use of video surveillance systems in other settings has increased. For example, it has become commonplace for homes, smaller businesses, parks, common areas, etc., to be equipped for monitoring by video surveillance systems. For example, such video surveillance systems may rely on low cost cameras and/or any other imaging sensors to monitor an area of interest. These cameras often include network interfaces enabling the cameras to be connected to a network, which allows the cameras to transmit their respective video feeds to one or more remote monitoring facilities. These remote monitoring facilities again rely on monitoring stations manned by human operators to view the monitored video feeds, flag events of interest, and take appropriate actions in response to the events of interest.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
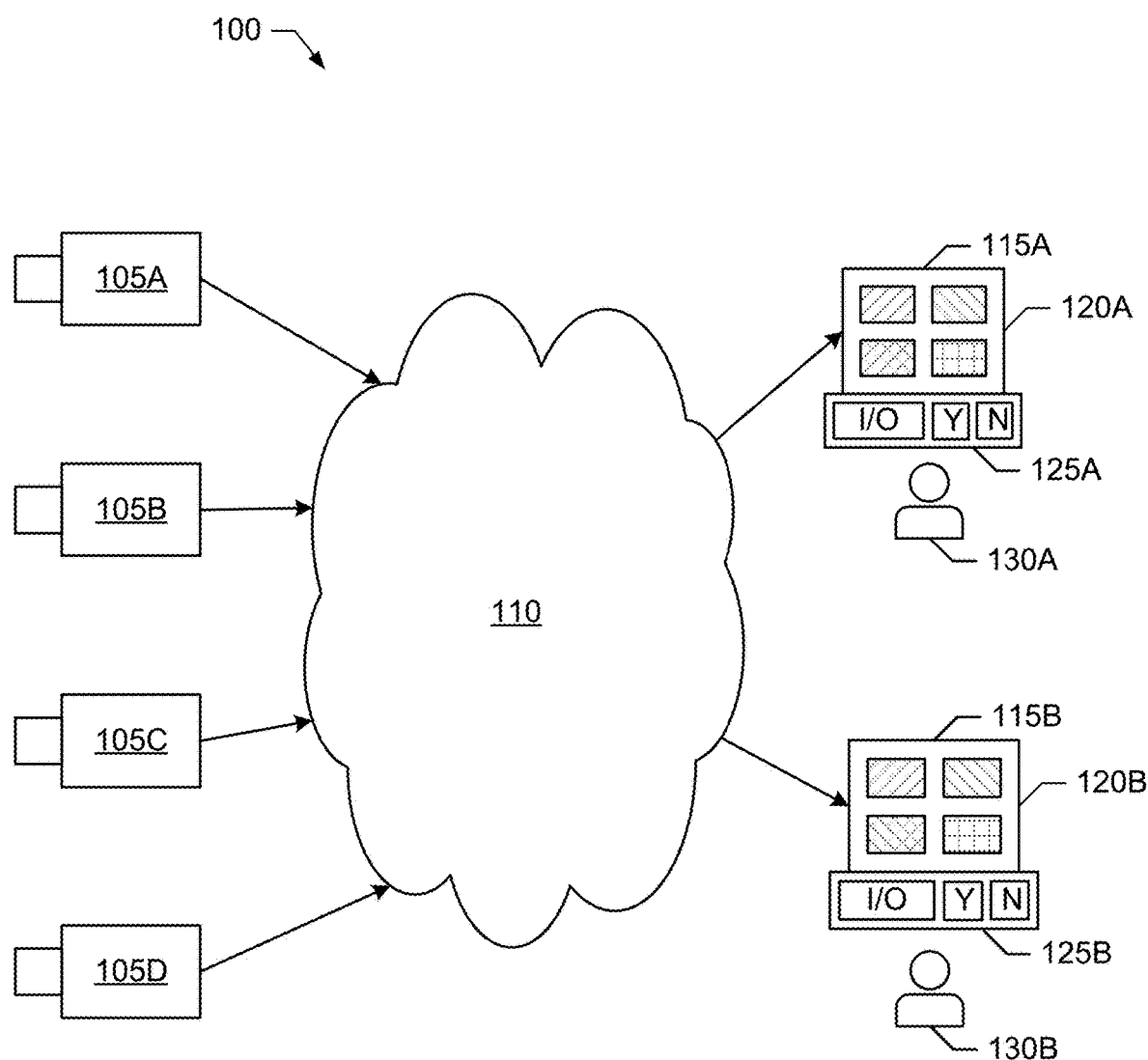
FIG. 1 is a block diagram of an example video surveillance system.

Example methods, apparatus, systems and articles of manufacture (e.g., physical storage media) to implement video surveillance with neural networks are disclosed herein. Example video surveillance systems disclosed herein include a database to store operator-labeled video segments (e.g., as records of operator-labeled video segments). The operator-labeled video segments include reference video segments and corresponding reference event labels to describe the reference video segments. Disclosed example video surveillance systems also include a neural network including a first instance of an inference engine, and a training engine to train the first instance of the inference engine based on a training set of the operator-labeled video segments obtained from the database. In disclosed examples, the first instance of the inference engine is to infer events from the operator-labeled video segments included in the training set. Disclosed example video surveillance systems further include a second instance of the inference engine to infer events from monitored video feeds, with the second instance of the inference engine being based on (e.g., initially a duplicate of) the first instance of the inference engine.

In some disclosed examples, the reference event labels indicate whether the corresponding reference video segments depict a defined event.

In some disclosed examples, a first one of the reference event labels corresponding to a first one of the reference video segments indicates (i) a type of event and (ii) whether the first one of the reference video segments depicts the type of event.

Some disclosed example video surveillance systems include a monitoring station. In some disclosed examples, the monitoring station includes a display to present a first one of the monitored video feeds, and a monitoring interface to generate operator event labels based on operator decisions corresponding to monitored video segments of the first one of the monitored video feeds.

In some such disclosed examples, the database is in communication with the monitoring station to receive a first one of the monitored video segments and a first one of the operator event labels corresponding to the first one of the monitored video segments. In some such examples, the database is to store the first one of the monitored video segments and the corresponding first one of the operator event labels as a first one of the reference video segments and a corresponding first one of the reference event labels included in a first one of the operator-labeled video segments.

Additionally or alternatively, in some such disclosed examples, the monitoring station is further to implement the second instance of the inference engine. For example, the second instance of the inference engine can output an inferred event for a second one of monitored video segments of the first one of the monitored video feeds presented by the display of the monitoring station. In some such examples, the monitoring interface of the monitoring station is to generate a second one of the operator event labels from an operator decision detected for the second one of monitored video segments. In some such examples, the monitoring station further includes a comparator to compare the inferred event and the second one of the operator event labels to obtain updated training data. In some disclosed examples, the neural network is in communication with the monitoring station to receive the updated training data, and the training engine of the neural network is to retrain the first instance of the inference engine based on the updated training data.

These and other example methods, apparatus, systems and articles of manufacture (e.g., physical storage media) to implement video surveillance with neural networks are disclosed in greater detail below.

Video surveillance systems are commonly used by larger institutions, such as large commercial enterprises, government offices, education institutions, etc., for security monitoring. More recently, as the cost of video surveillance cameras has decreased, the use of video surveillance systems in other settings has increased. For example, it has become commonplace for homes, smaller businesses, parks, common areas, etc., to be equipped for monitoring by video surveillance systems. Such newer video surveillance systems may rely on low cost cameras and/or any other imaging sensors capable of being connected to a network, such as the Internet, one or more cloud services accessible via the Internet and/or other networks, etc. Such network access enables the cameras and/or other imaging sensors to transmit their respective video feeds to one or more remotely located monitoring facilities. These remote monitoring facilities typically rely on monitoring stations manned by human operators to view the monitored video feeds, flag events of interest, and take appropriate actions in response to the events of interest. As the cost of video surveillance cameras/sensor and associated networking technology continues to decrease, use of video surveillance is expected to continue to grow, potentially exponentially. However, the reliance on monitoring stations manned by human operators to monitor the video feeds generated by the video surveillance systems limits the scalability of video surveillance and can affect the accuracy with which events are detected, especially as human operators become overloaded by the number of video feeds to be monitored.

Video surveillance systems implemented with neural networks as disclosed herein provide technical solutions to the scalability and accuracy problems associated with prior video surveillance systems that rely on human operators for video feed monitoring. Example video surveillance systems disclosed herein include neural networks having inference engines that are trained to detect, or infer, events in monitored video feeds. As disclosed in further detail below, the neural networks are trained using a training set of reference video segments with reference event labels determined based on decisions made by human operators. For example, the reference event labels can describe whether the corresponding reference video segments depict a defined event (e.g., such as a security violation, presence of an individual, arrival of a package, any specified/predetermined event, etc.). In some examples, a reference event label can also include a description of a type of event of interest (e.g., such as a security violation, presence of an individual, arrival of a package, etc.) and an indication of whether the corresponding reference video segment depicts the described event.

As described in further detail below, some disclosed example video surveillance systems deploy instances of the trained inference engines to one or more monitoring locations to infer events from respective monitored video feeds. For example, the trained inference engines may operate (e.g., in parallel, asynchronously, in cooperation, etc.) to infer whether one or more trained events (e.g., such as a security violation, presence of an individual, arrival of a package, etc.) are represented in the corresponding video feeds they monitor. In some such examples, the trained inference engines may be deployed for execution by, or operation in conjunction with, monitoring stations manned by human operators to augment the monitoring performed by the human operators. In some such examples, the inferred events output by a trained inference engine operating in conjunction with a manned monitoring station can be compared with the corresponding decisions made by the human operator to determine updated training data that can be used to refine operation of the inference engines. For example, the neural network in the video surveillance systems can receive the updated training data, retrain its inference engine, and then redeploy instances of the retrained inference engine to one or more of the monitoring locations. In some examples, the instances of the trained/retrained inference engines can be deployed to unmanned monitoring locations, or to provide additional capacity at manned locations, thereby allowing the capacity of the video surveillance system to readily scale as demand increases. These and other aspects of video surveillance with neural networks as disclosed herein are described in further detail below.

Turning to the figures, a block diagram of an example video surveillance system 100 is illustrated in FIG. 1. The example video surveillance system 100 of FIG. 1 includes example imaging sensors 105A-D, an example network 110 and example monitoring stations 115A-B. In the illustrated example of FIG. 1, the imaging sensors 105A-D are configured to monitor areas of interest, such as, but not limited to, areas in one or more commercial enterprises, small businesses, government offices, education institutions, homes, parks, common areas, etc., and/or any combination thereof. The example imaging sensors 105A-D can include any number, type(s) and/or combination(s) of imaging sensors. For example, the imaging sensors 105A-D can be implemented by one or more video cameras, smartphones, photodiodes, light detectors, etc.

In the example video surveillance system 100 of FIG. 1, the imaging sensors 105A-D include network interfaces capable of communicating with the example network 110. The example network 110 can be implemented by any number, type(s) and/or combination(s) of networks. For example, the network 110 can be implemented by the Internet and/or one or more cloud services accessible via the Internet. In some examples, the imaging sensors 105A-D include network interfaces capable of accessing the network 110 via one or more wireless access points (e.g., a cellular access point/base station, a wireless local area network access point, a Bluetooth access point, etc.), wired access points (e.g., such as an Ethernet access point, a cabled communication link, etc.), or any combination thereof.

In the example video surveillance system 100 of FIG. 1, the imaging sensors 105A-D transmit their respective video feeds to the monitoring stations 115A-B, which include respective network interfaces capable of communicating with the network 110. As such, the monitoring stations 115A-B are in communication with the imaging sensors 105A-D via the network 110. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The monitoring stations 115A-B of the illustrated example can be implemented by any system/device capable of presenting monitored video feeds and accepting user input concerning the monitored video feeds. For example, the monitoring stations 115A-B can be implemented by any number, type(s) and/or combination(s) of computing systems/devices, such as one or more computers, workstations, smartphones, tablet computers, personal digital assistants (PDAs), etc. In some examples, the monitoring stations 115A-B are implemented by processor platforms, such as the example processor platform 900 illustrated in FIG. 9, which is described in further detail below.

In the illustrated example of FIG. 1, the monitoring stations 115A-B include respective example displays 120A-B and respective example monitoring interfaces 125A-B to enable the video feeds reported by the imaging sensors 105A-D to be monitored by human operators 130A-B. In the illustrated example, displays 120A-B of the respective monitoring stations 115A-B are configured to present one or more of the video feeds reported by the imaging sensors 105A-D. For example, the displays 120A-B can present one video feed, cycle through presenting multiple video feeds one at a time, present multiple video feeds simultaneously in a tiled manner, etc.

The monitoring interfaces 125A-B of the respective monitoring stations 115A-B are configured to accept inputs from the human operators 130A-B reflecting decisions made by the human operators 130A-B concerning whether events are depicted in the video feeds presented by the displays 120A-B. For example, the monitoring interfaces 125A-B can include input buttons or keys (labeled "Y" and "N" in FIG. 1) to allow the human operators 130A-B to indicate whether video segments of the monitored video feeds depict or otherwise represent an event of interest (e.g., with "Y" indicating that the event of interest is depicted/represented, and "N" indicating that the event of interest of not depicted/represented). For example, the human operators 130A-B may be trained detect an event of interest, such as, but not limited to a security violation, presence of an individual, arrival of a package, etc. In some such examples, the "Y" and "N" inputs of the monitoring interfaces 125A-B can be used by the human operators 130A-B to indicate whether an event of interest is depicted or otherwise represented in a video segment of a monitored video feed. In some examples, the monitoring interfaces 125A-B can include further input/output capabilities (labeled "I/O" in FIG. 1) to provide more flexibility by allowing the human operators 130A-B to enter a description of a type of event. In such examples, the human operators 130A-B are not restricted to monitoring for just one or more events of interest, but can enter descriptions of any type of event of interest. As such, this additional capability allows the events of interest to change over time. In some examples, the human operators 130A-B can use the "I/O" interface to enter a description of the type of event being monitored for in a particular video segment of a monitored video feed, and can use the "Y" and "N" inputs to indicate whether that event is indeed depicted or otherwise represented in the monitored video segment.

Although the example video surveillance system 100 of FIG. 1 is illustrated as including four imaging sensors 105A-D, one network 110 and two monitoring stations 115A-B, the video surveillance system 100 is not limited thereto. On the contrary, the example video surveillance system 100 can include any number of imaging sensors 105A-D, any number of networks 110 and any number of monitoring stations 115A-B.

Figure 2:
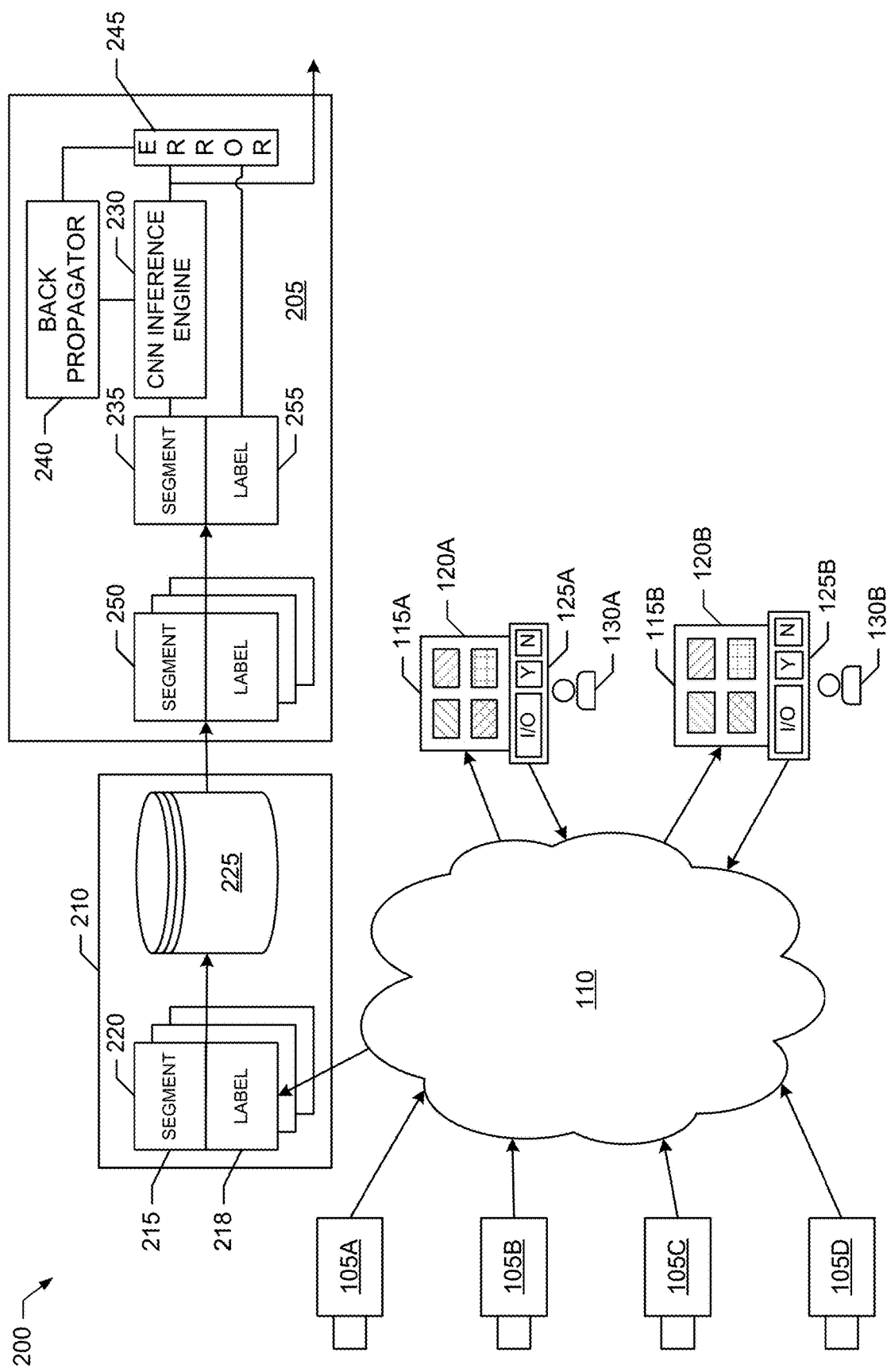
FIG. 2 is a block diagram of a first example video surveillance system including a trainable neural network structured to support video surveillance in accordance with teachings of this disclosure.

A block diagram of a first example video surveillance system 200 implementing video surveillance with a neural network in accordance with teachings of this disclosure is illustrated in FIG. 2. The example video surveillance system 200 of FIG. 2 includes the example imaging sensors 105A-D, the example network 110 and the example monitoring stations 115A-B of the video surveillance system 100 of FIG. 1. As such, aspects of these elements of the video surveillance system 200 are described above in connection with the description of FIG. 1.

The example video surveillance system 200 of FIG. 2 also includes an example neural network 205 and an example database 210 implemented in accordance with teachings of this disclosure. The example database 210 includes one or more network interfaces capable of communicating with the example network 110. In the illustrated example of FIG. 2, the database 210 is in communication with the monitoring stations 115A-B via the network 110 and receives video segments with corresponding event labels describing the video segments from the monitoring stations 115A-B. The video segments received from the monitoring stations 115A-B are taken from the video feeds being monitored. The event labels indicate whether the corresponding video segments depict or otherwise represent an event of interest based on decision information entered by the human operators 130A-B. In some examples, the event label for a corresponding video segment indicates whether the video segment depicts or otherwise represents a defined event. In some examples, the event label for a corresponding video segment includes a description of, or otherwise indicates, a type of event, and also indicates whether the video segment depicts or otherwise represents that type of event.

In the illustrated example, the database 210 treats the video segments with corresponding event labels received from the monitoring stations 115A-B as operator-labeled video segments to be used to train the neural network 205. For example, the database 210 treats the video segments received from the monitoring stations 115A-B as example reference video segments 215 of the operator-labeled video segments, and the corresponding event labels received from the monitoring stations 115A-B as reference event labels 218 corresponding to the reference video segments 215 of the operator-labeled video segments. Furthermore, the database 210 creates example records 220 of the operator-labeled video segments, which include the reference video segments 215 and corresponding reference event labels 218 of the operator-labeled video segments represented by the records 220. As such, each record 220 of an operator-labeled video segment includes the reference video segment 215 and corresponding reference event label 218 for the operator-labeled video segment represented by that record 220. Thus, in some examples, the database 210 implements means for obtaining operator-labeled video segments, where the operator-labeled video segments include reference video segments and corresponding reference event labels to describe the reference video segments. Other means for obtaining operator-labeled video segments may include, but are not limited to, computing devices, servers, cloud-based services, web sites, etc., structured to collect and combine video segments with corresponding event labels describing the video segments to form operator-labeled video segment.

The database 210 of the illustrated example also includes example record storage 225 to store the records 220 of the operator-labeled video segments created by the database 210 from the video segments and corresponding event labels received from the monitoring stations 115A-B. The record storage 225 of the database 210 of the illustrated example can be implements by any number and/or type(s) of storage technology, memory technology, etc. For example, the database 210 can be implemented by any computing system/device, such as the example processor platform 1000 illustrated in FIG. 10, which is described in further detail below. In such examples, the record storage 225 may be implemented by one or more of the example mass storage devices 1028 and/or the volatile memory 1014 of the example processor platform 1000.

The neural network 205 of the illustrated example includes an example inference engine 230 to infer events from video segments, such as video segments from monitored video feeds obtained from the imaging sensors 105A-D. In the illustrated example, the inference engine 230 is implemented by a convolutional neural network (CNN) inference engine including one or more layers of weights, also referred to as neurons, that are trained to infer event from video segments. For example, the inference engine 230 may be structured to include an input layer to accept one or more input video segments 235 as input data, one or more hidden layers to process the input data, and an output layer to provide one or more outputs indicating whether a given input video segment 235 depicts or otherwise represents one or more events for which the inference engine 230 has been trained to detect. In some examples, the output(s) of the inference engine 230 may additionally or alternatively provide a likelihood (e.g., a probability) that a given input video segment 235 depicts or otherwise represents one or more events for which the inference engine 230 has been trained to detect. Although the inference engine 230 of the illustrated example neural network 205 is implemented by a CNN, other neural network solutions can be used to implement the inference engine 230.

The neural network 205 of the illustrated example also includes an example training engine 240, an example comparator 245 and an example training data retriever 250 to train the inference engine 230 to infer events from input video segments 235. In the illustrated example, the training data retriever 250 retrieves a set of the records 220 of operator-labeled video segments from the database 210 to be used as training data to train the inference engine 230. For example, the training data retriever 250 may send a request to the database 210 for a set of the records 220 of operator-labeled video segments. In some examples, the request includes a number of the records 220 being requested. In some examples, the request additionally or alternatively includes the type of event to be depicted or otherwise represented by the records 220 of operator-labeled video segments included in the training set. In such an example, the database 210 may respond to the request by retrieving the requested set of the records 220 of operator-labeled video segments from the record storage 225, and sending the retrieved set of records 220 to the training data retriever 250.

In the illustrated example, after the requested set of training records 220 is obtained from the database 210, the training data retriever 250 applies the training records 220 to the inference engine 230 to train the inference engine 230 to infer events from the operator-labeled video segments included in the training set of records 220. For example, for a given one of the training records 220, the training data retriever 250 applies the reference video segment of that training record 220 as the input video segment 235 to the inference engine 230. The training data retriever 250 also applies the corresponding reference event label of that training record as an example training event label 255 to be compared by the comparator 245 to the inferred event decision output from the inference engine 230. Ideally, when trained, the inferred event decision output from the inference engine 230 would match the training event label 255 corresponding to the input video segment 235 (e.g., yielding an error of zero). However, while the inference engine 230 is being trained, the comparator 245 may detect errors between the training event label 255 and the inferred event decision output from the inference engine 230. In the illustrated example, the output of the comparator 245 is provided to the training engine 240, which feeds back the error in any appropriate manner to update the layer(s) of weights of the inference engine 230 to the accuracy with which the inference engine 230 infers events from input segments 235. For example, the training engine 240 is illustrated as a back propagator that performs back propagation to train the inference engine 230. However, any other appropriate training mechanism may be implemented by the training engine 240. Thus, in some examples, the training engine 240 implements means for training a first instance of an inference engine based on a training set of the operator-labeled video segments, where the first instance of the inference engine is to infer events from the operator-labeled video segments included in the training set. Other means for training a first instance of an inference engine based on a training set of the operator-labeled video segments may include, but are not limited to, computing devices, servers, cloud-based services, web sites, etc., structured to obtain a training set of the operator-labeled video segments and apply the training set to any type of machine learning inference engine to train the inference engine.

In some examples, the training data retriever 250 continues to apply different ones of the training records 220 to the inference engine 230 until the comparator 245 indicates that a desired inference accuracy has been achieved. For example, the inference accuracy can be specified as a threshold rate of correct event detections (e.g., corresponding to a percentage of the number of input reference video segments for which the inference engine 230 correctly infers whether the corresponding event is present as represented by the reference event labels), a threshold rate of false event detections (e.g., corresponding to a percentage of the number of input reference video segments for which the inference engine 230 incorrectly infers the corresponding event is present when the event is actually not present as indicated by the reference event labels corresponding to the reference video segments), a threshold missed event detection (e.g., corresponding to a percentage of the number of input reference video segments for which the inference engine 230 incorrectly infers the corresponding event is not present when the event is actually present as indicated by the reference event labels corresponding to the reference video segments), etc.

Although the example video surveillance system 200 of FIG. 2 is illustrated as including four imaging sensors 105A-D, one network 110, two monitoring stations 115A-B, one neural network 205 and one database 210, the video surveillance system 200 is not limited thereto. On the contrary, the example video surveillance system 200 can include any number of imaging sensors 105A-D, any number of networks 110, any number of monitoring stations 115A-B, any number of neural networks 205 and any number of databases 210.

Figure 3:
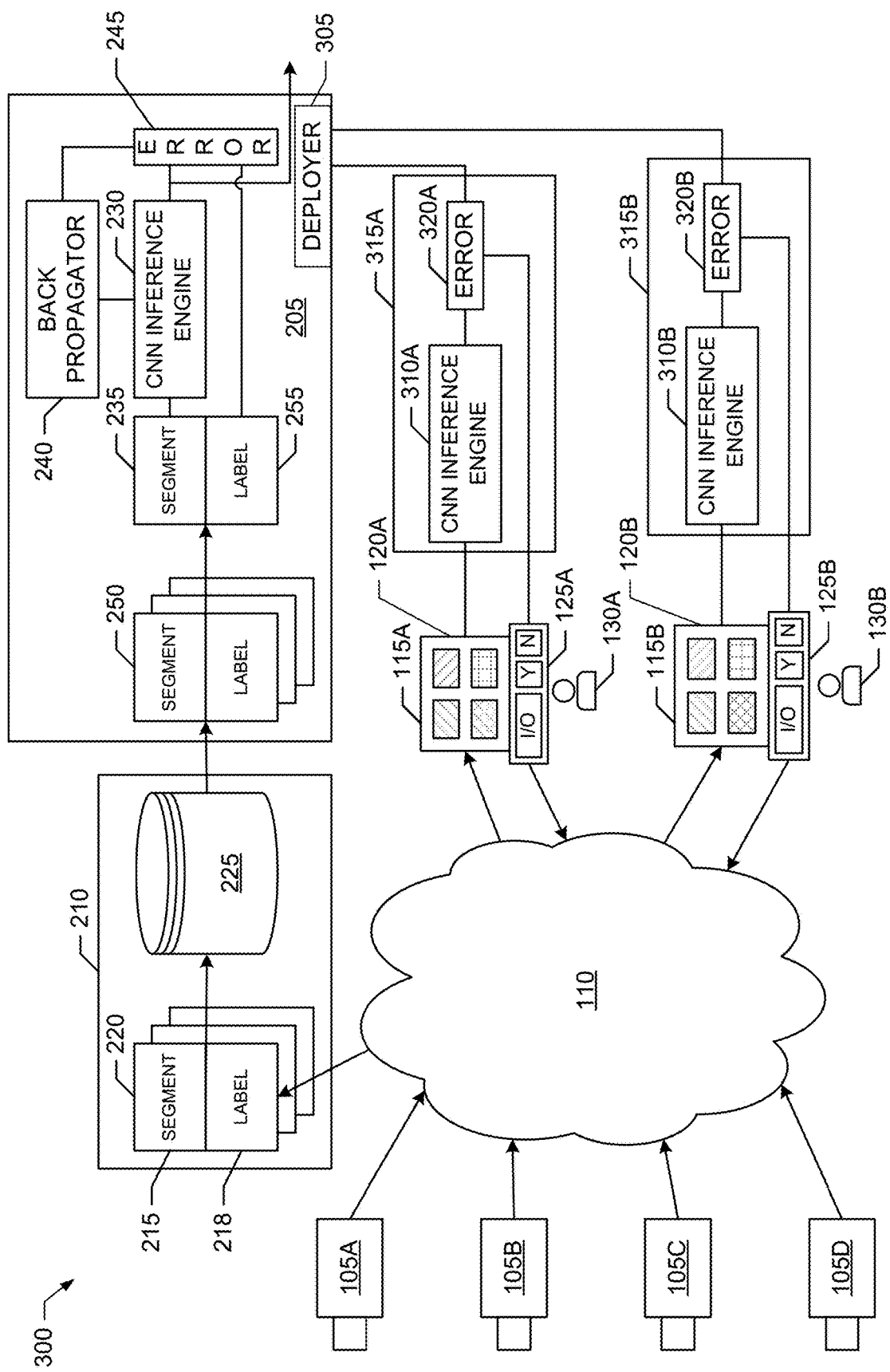
FIG. 3 is a block diagram of a second example video surveillance system including a trainable neural network and trained inference engines structured to support video surveillance in accordance with teachings of this disclosure.

A block diagram of a second example video surveillance system 300 implementing video surveillance with a neural network in accordance with teachings of this disclosure is illustrated in FIG. 3. The example video surveillance system 300 of FIG. 3 includes the example imaging sensors 105A-D, the example network 110 and the example monitoring stations 115A-B of the video surveillance systems 100 and 200 of FIGS. 1 and 2. As such, aspects of these elements of the video surveillance system 300 are described above in connection with the descriptions of FIGS. 1 and 2. The example video surveillance system 300 of FIG. 3 also includes the example neural network 205 and the example database 210 of the video surveillance system 200 of FIG. 2. As such, aspects of these elements of the video surveillance system 300 are described above in connection with the descriptions of FIG. 2.

In the illustrated example video surveillance system 300 of FIG. 3, the neural network 205 also includes an example deployer 305 to deploy instances of the trained inference engine 230 to infer events from monitored video feeds. As such, in the illustrated example, the inference engine 230 corresponds to a first, or reference, instance of the inference engine 230, and the deployer deploys other instances of the inference engine 230, which are based on (e.g., initially duplicates of) the first, or reference, instance of the inference engine 230. For example, the deployer 305 deploys a second example instance 310A of the inference engine 230 for execution by, or in conjunction with, the example monitoring station 115A, and deploys a third example instance 310B of the inference engine 230 for execution by, or in conjunction with, the example monitoring station 115B.

In some examples, the deployer 305 deploys instances of the inference engine 230, such as the second instance 310A and the third instance 310B, as data representing the trained layers of weights obtained by training the first instance of the inference engine 230 included in the neural network 205. In such examples, the deployer 305 downloads (e.g., via the network 110) the data representing the trained layers of weights to the instances of the inference engine 230, such as the second instance 310A and the third instance 310B, already present at the target monitoring locations. In some examples, the deployer 305 deploys instances of the inference engine 230, such as the second instance 310A and the third instance 310B, as downloadable executables (e.g., downloaded via the network 110) that are executed by computing devices, such as the monitoring stations 115A-B. Thus, in some examples, the deployer 305 implements means for deploying an instance of an inference engine to infer events from monitored video feeds, where the deployed instance of the inference engine is based on (e.g., initially a duplicate of) a trained instance of the inference engine. Other means for deploying an instance of an inference engine may include, but are not limited to, computing devices, servers, cloud-based services, web sites, etc., structured to obtained and deploy copies of trained instances of inference engines.

In the example video surveillance system 300 of FIG. 3, the second instance 310A of the inference engine 230 and the third instance 310B of the inference engine 230 are part of respective enhanced inference engines 315A and 315B executed by, or otherwise implemented to operate in conjunction with, the respective monitoring stations 115A-B. In the illustrated example, the enhanced inference engine 315A is executed or otherwise implemented by the monitoring station 115A to infer events from monitored video feeds being processed by the monitoring station 115A. For example, the second instance 310A of the inference engine 230 included in the enhanced inference engine 315A accepts video segments of video feeds monitored by the monitoring station 115A and outputs inferred events for the monitored video segments (e.g., such as indications of whether a particular event is depicted in respective ones of the monitored video segments). The enhanced inference engine 315A also includes an example comparator 320A to determine updated training data by comparing the inferred events output by the second instance 310A of the inference engine 230 for the corresponding monitored video segments with respective operator event labels generated by the monitoring station 115A from operator decisions detected by the monitoring station 115A (e.g., as entered by the human operator 130A via the monitoring interface 125A, as described above) for the corresponding monitored video segments. The comparator 320A reports this updated training data to the neural network 205 (e.g., via the network 110).

Similarly, in the illustrated example of FIG. 3, the enhanced inference engine 315B is executed or otherwise implemented by the monitoring station 115B to infer events from monitored video feeds being processed by the monitoring station 115B. For example, the third instance 310B of the inference engine 230 included in the enhanced inference engine 315B accepts video segments of video feeds monitored by the monitoring station 115B and outputs inferred events for the monitored video segments (e.g., such as indications of whether a particular event is depicted in respective ones of the monitored video segments). The enhanced inference engine 315B also includes an example comparator 320B to determine updated training data by comparing the inferred events output by the third instance 310B of the inference engine 230 for the corresponding monitored video segments with respective operator event labels generated by the monitoring station 115B from operator decisions detected by the monitoring station 115B (e.g., as entered by the human operator 130B via the monitoring interface 125B, as described above) for the corresponding monitored video segments. The comparator 320B reports this updated training data to the neural network 205 (e.g., via the network 110).

In the illustrated example of FIG. 3, the neural network 205 uses the updated training data received from the enhanced inference engines 315A-B implemented by the respective monitoring stations 115A-B to retrain the first instance of the inference engine 230 included in the neural network 205 to improve event inference accuracy. For example, the neural network 205 may retrain the first instance of the inference engine 230 at periodic intervals, based on one or more events (e.g., such as when a threshold amount of updated training data has been received from the enhanced inference engines 315A-B implemented by the respective monitoring stations 115A-B), based on an operator input, etc., or any combination thereof. In some examples, the deployer 305 of the illustrated example neural network 205 then redeploys instances of the retrained inference engine 230 to one or more of the target monitoring locations. For example, the deployer 305 can redeploy instances of the retrained inference engine 230 to update/replace the second instance 310A of the inference engine 230 implemented by the monitoring station 115A and/or the third instance 310B of the inference engine 230 implemented by the monitoring station 115B.

Although the example video surveillance system 300 of FIG. 3 is illustrated as including four imaging sensors 105A-D, one network 110, two monitoring stations 115A-B implementing two enhanced inference engines 315A-B, one neural network 205 and one database 210, the video surveillance system 200 is not limited thereto. On the contrary, the example video surveillance system 200 can include any number of imaging sensors 105A-D, any number of networks 110, any number of monitoring stations 115A-B implementing any number of enhanced inference engines 315A-B, any number of neural networks 205 and any number of databases 210.

Figure 4:
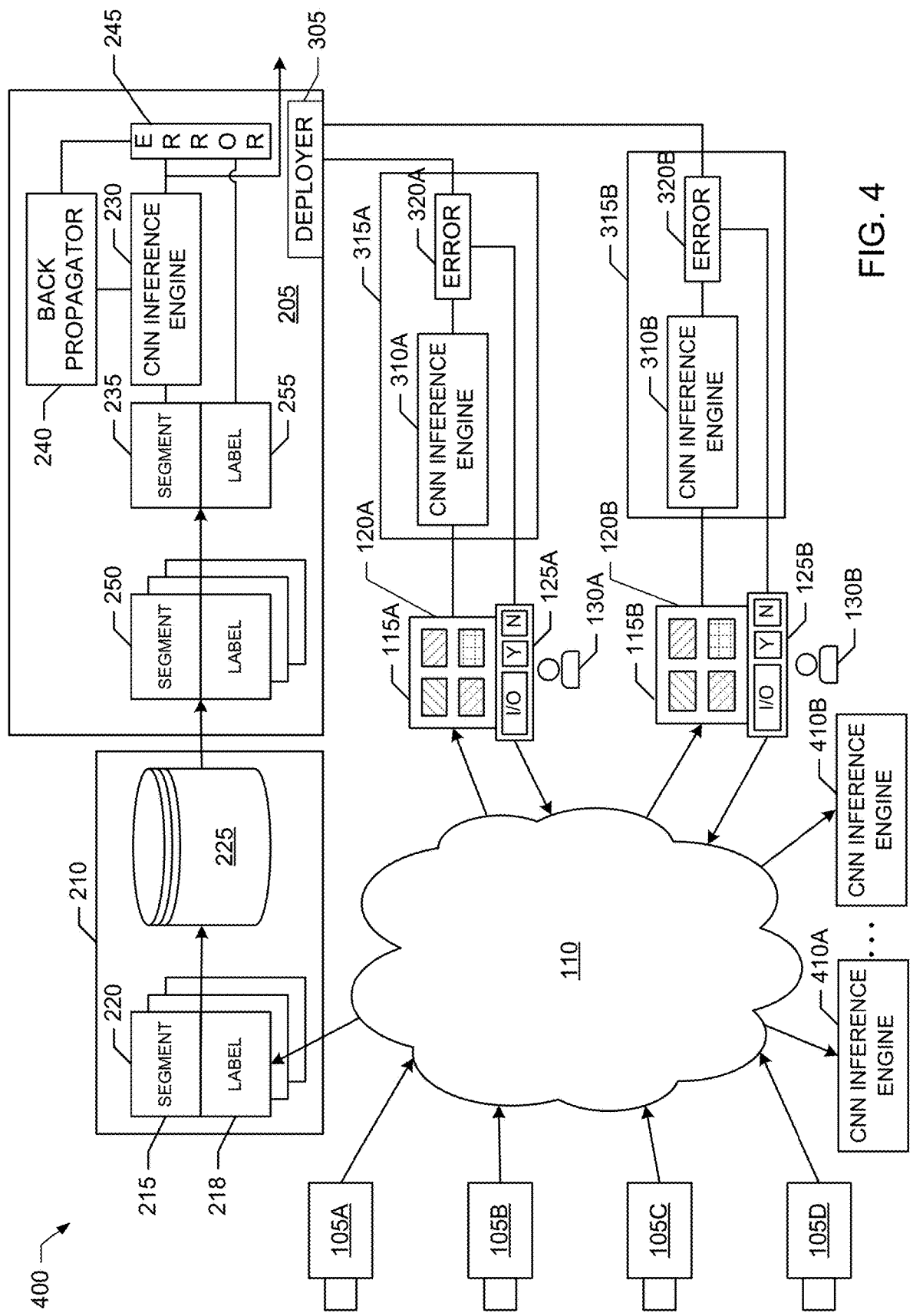
FIG. 4 is a block diagram of a third example video surveillance system including a trainable neural network and trained inference engines structured to support video surveillance in accordance with teachings of this disclosure.

A block diagram of a third example video surveillance system 400 implementing video surveillance with a neural network in accordance with teachings of this disclosure is illustrated in FIG. 4. The example video surveillance system 400 of FIG. 4 includes the example imaging sensors 105A-D, the example network 110 and the example monitoring stations 115A-B of the video surveillance systems 100, 200 and 300 of FIGS. 1-3. As such, aspects of these elements of the video surveillance system 400 are described above in connection with the descriptions of FIGS. 1-3. The example video surveillance system 400 of FIG. 3 also includes the example neural network 205 and the example database 210 of the video surveillance systems 200 and 300 of FIGS. 2-3. As such, aspects of these elements of the video surveillance system 400 are described above in connection with the descriptions of FIGS. 2-3.

In the illustrated example video surveillance system 400 of FIG. 4, the deployer 305 of the neural network 205 also deploys instances of the trained inference engine 230 for monitoring video feeds not in conjunction with the monitoring stations 115A-B. For example, in the video surveillance system 400, the deployer 305 of the neural network 205 can deploy instances of the trained inference engine 230 to unmanned monitoring locations. Additionally or alternatively, the deployer 305 of the neural network 205 can deploy instances of instances of the trained inference engine 230 to monitoring locations having monitoring stations, such as the monitoring stations 115A-B, but for operation independently from the monitoring stations. For example, in the video surveillance system 400 of FIG. 4, the deployer 305 of the neural network 205 deploys a fourth example instance 410A of the inference engine 230 and a fifth example instance 410B of the inference engine 230 to monitor video feeds independently of the monitoring stations 115A-B. As such, the additional instances of the inference engine 230 can be deployed to increase monitoring capacity in the video surveillance system 400 in a cost-efficient manner.

Although the example video surveillance system 400 of FIG. 4 is illustrated as including four imaging sensors 105A-D, one network 110, two monitoring stations 115A-B implementing two enhanced inference engines 315A-B, one neural network 205, one database 210 a two separate instances 410A-B of the inference engine 230, the video surveillance system 200 is not limited thereto. On the contrary, the example video surveillance system 200 can include any number of imaging sensors 105A-D, any number of networks 110, any number of monitoring stations 115A-B implementing any number of enhanced inference engines 315A-B, any number of neural networks 205, any number of databases 210 and any number of instances 410A-B of the inference engine 230.

Also, although the illustrated example video surveillance systems 200, 300 and 400 include the imaging sensors 105A-D, surveillance monitoring with neural networks as disclosed herein is not limited to just video surveillance. For example, the neural network techniques disclosed herein can be adapted for use with other monitoring sensors. For example, the video surveillance systems 100, 200 and/or 300 can include other sensors in addition to, or as an alternative to, the imaging sensors 105A-D. Such other sensors can include, but are not limited to, motion sensors, heat/temperature sensors, acoustic sensors (e.g., microphones), electromagnetic sensors, etc. In such examples, these sensors transmit their respective data feeds via the network 110 for monitoring by one or more of the inference engines 230, 310A, 310B, 410A and/or 410B, possibly in conjunction with one or more of the monitoring stations 115A-B, While example manners of implementing the video surveillance systems 100, 200, 300 and 400 have been illustrated in FIGS. 1-4, one or more of the elements, processes and/or devices illustrated in FIGS. 1-4 may be combined, divided, re-arranged, omitted, eliminated and/or implemented in any other way. Further, the example video surveillance systems 100, 200, 300 and/or 400, the example imaging sensors 105A-D, the example network 110, the example monitoring stations 115A-B, the example neural network 205, the example database 210, the example enhanced inference engines 315A-B and/or the example instances 310A-B and/or 410A-B of the inference engine 230 of FIGS. 1-4 may be implemented by hardware, software, firmware and/or any combination of hardware, software and/or firmware. Thus, for example, any of the example video surveillance systems 100, 200, 300 and/or 400, the example imaging sensors 105A-D, the example network 110, the example monitoring stations 115A-B, the example neural network 205, the example database 210, the example enhanced inference engines 315A-B and/or the example instances 310A-B and/or 410A-B of the inference engine 230 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video surveillance systems 100, 200, 300 and/or 400, the example imaging sensors 105A-D, the example network 110, the example monitoring stations 115A-B, the example neural network 205, the example database 210, the example enhanced inference engines 315A-B and/or the example instances 310A-B and/or 410A-B of the inference engine 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example video surveillance systems 100, 200, 300 and/or 400 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the example video surveillance systems 100, 200, 300 and/or 400, the example imaging sensors 105A-D, the example network 110, the example monitoring stations 115A-B, the example neural network 205, the example database 210, the example enhanced inference engines 315A-B and/or the example instances 310A-B and/or 410A-B of the inference engine 230 are shown in FIGS. 5-8. In these examples, the machine readable instructions comprise one or more programs for execution by a processor, such as the processors 912, 1012 and/or 1112 shown in the example processor platforms 900, 1000 and 1100 discussed below in connection with FIGS. 9-11. The one or more programs, or portion(s) thereof, may be embodied in software stored on a non-transitory computer readable storage medium such as a CD-ROM, a floppy disk, a hard drive, a digital versatile disk (DVD), a Blu-ray Disk™, or a memory associated with the processors 912, 1012 and/or 1112, but the entire program or programs and/or parts thereof could alternatively be executed by a device other than the processors 912, 1012 and/or 1112, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-8, many other methods of implementing the example video surveillance systems 100, 200, 300 and/or 400, the example imaging sensors 105A-D, the example network 110, the example monitoring stations 115A-B, the example neural network 205, the example database 210, the example enhanced inference engines 315A-B and/or the example instances 310A-B and/or 410A-B of the inference engine 230 may alternatively be used. For example, with reference to the flowcharts illustrated in FIGS. 5-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Also, as used herein, the terms "computer readable" and "machine readable" are considered equivalent unless indicated otherwise.

Figure 5:
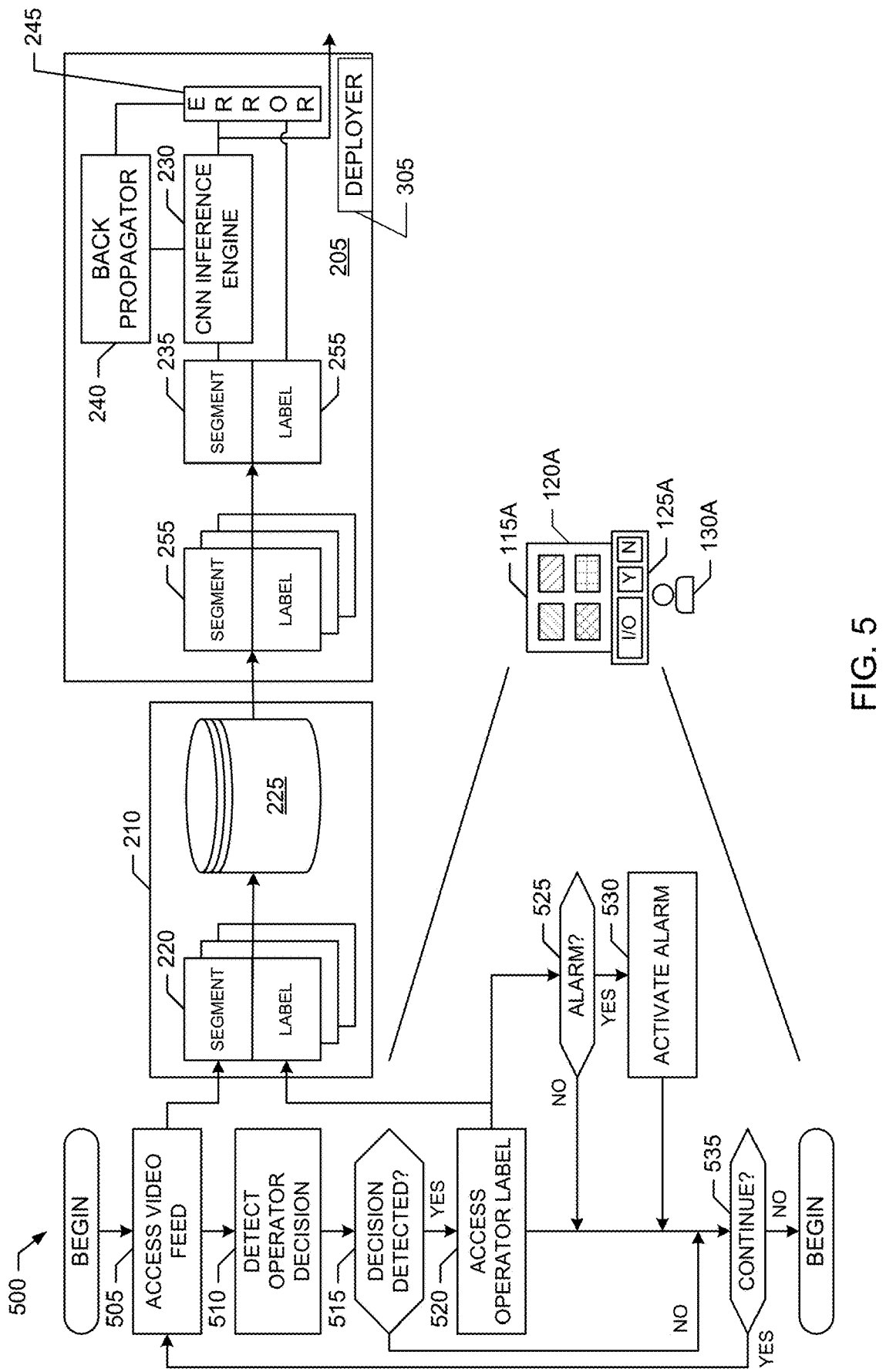
FIGS. 5-8 illustrate flowcharts representative of example machine readable instructions that may be executed to implement the example video surveillance systems of FIGS. 2-4.

An example program 500 that may be executed to implement one or more of the example monitoring stations 115A-B included in the example video surveillance systems 100, 200, 300 and 400 of FIGS. 1-4 is illustrated in FIG. 5. For convenience, and without loss of generality, execution of the example program 500 is described from the perspective of the example monitoring stations 115A operating in the example video surveillance system 400 of FIG. 4. With reference to the preceding figures and associated written descriptions, the example program 500 of FIG. 5 begins execution at block 505 at which the monitoring station 115A accesses a video feed received from one of the imaging sensors 105A-D via the network 110 and presents the accessed video feed via the display 120A of the monitoring station 115A. At block 510, the monitoring station 115A detects an operator decision input by the human operator 130A via the monitoring interface 125A of the monitoring station 105A. As described above, the operator decision detected at block 510 indicates whether an event of interest is depicted or otherwise represented in the monitored video feed. For example, the monitoring station 115A may segment the accessed video feed into monitored video segments based on any segmentation criteria. For example, the monitoring station 115A may segment the monitored video feed into successive video segments having a given duration (e.g., 15 seconds, 30 seconds, 60 seconds, etc., or any duration), based on detected transitions in the video feed, based on characteristics of the imaging sensor 105A-D providing the feed (e.g., such as a sweep rate of the sensor, an image capturing rate of the sensor, etc.). In such examples, the monitoring interface 125A associates an input operator decision with the particular monitored video segment being presented by the display 120A at that time. In some examples, if no input operator decision is detected while a given video segment is being presented, the monitoring interface 125A determines that the operator decision is that no event of interest is being depicted in that given video segment. As described above, in some examples, the input operator decision is a Yes or No indication as to whether a predefined event of interest is being depicted in the monitored video segment. However, in some examples, the input operator decision can also include a description of a type of event of interest, as well as a Yes or No indication as to whether that described event of interest is being depicted in the monitored video segment.

At block 515, the monitoring interface 125A of the monitoring station 115A determines whether an input operator decision has been detected. If an operator decision is detected (block 515), at block 520 the monitoring interface 125A accesses an event label to be associated with the current monitored video segment and updates the event label to reflect the input operator decision. For example, the event label can indicate whether a predefined event of interest is being depicted in the corresponding monitored video segment. In some examples, the event label includes a description of the type of event of interest, and an indication as to whether that described event of interest is being depicted in the corresponding monitored video segment. In some examples, if no input operator decision is detected while a given video segment is being presented, at block 520 the monitoring interface 125A updates the event label for that video segment to indicate that no event of interest is being depicted in the corresponding video segment. As illustrated in the example of FIG. 5, the monitoring station 105A also provides the video segments of the video accessed at block 505 and the corresponding event labels accessed at block 520 to the database 210 to enable the database 210 to create the records 220 of the operator-labeled video segments described above.

In the illustrated example of FIG. 5, at block 525, the monitoring interface 125A of the monitoring station 115A determines whether the input operator decision detected for the current monitored video segment corresponds to detection of an event for which an alarm is to be triggered. If an alarm is to be triggered (block 525), at block 530 the monitoring interface 125A causes the alarm to be triggered. For example, at block 530, the monitoring interface 125A may automatically trigger audible and/or visual alarms, may contact an emergency response system to summon first responders, etc. At block 535, the monitoring station 115A determines whether video surveillance monitoring is to continue. If video surveillance monitoring is to continue (block 535), processing returns to block 505 and blocks subsequent thereto to enable the monitoring station 115A to continue monitoring the current video feed and/or other video feeds being received by the monitoring station 115A from the imaging sensors 105A-D via the network 110.

Figure 6:
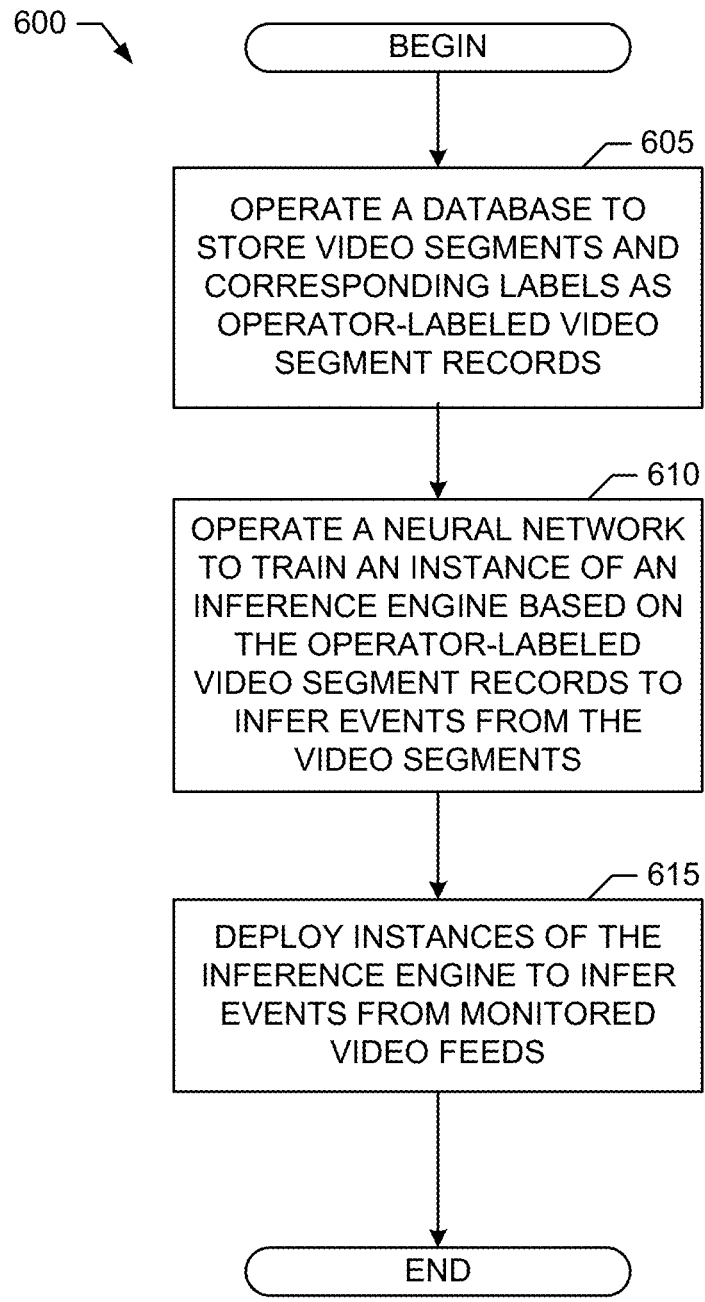

An example program 600 that may be executed to implement the example neural network 205 and the example database 210 included in the example video surveillance systems 200, 300 and 400 of FIGS. 2-4 is illustrated in FIG. 6. For convenience, and without loss of generality, execution of the example program 600 is described from the perspective of the example neural network 205 and the example database 210 operating in the example video surveillance system 400 of FIG. 4. With reference to the preceding figures and associated written descriptions, the example program 600 of FIG. 6 begins execution at block 605 at which the database 210 stores the monitored video segments and the corresponding event labels received from the monitoring stations 115A-B via the network 110 as the records 220 of the operator-labeled video segments, as described above. At block 610, the neural network 205 uses the records 220 of the operator-labeled video segments created and stored by the database 210 to train a first, or reference, instance of its example inference engine 230 to infer events from video segments, as described above. At block 615, the neural network 205 deploys instances of the trained inference engine 230 to monitoring sites to infer events from monitored video feeds, as described above.

Figure 7:
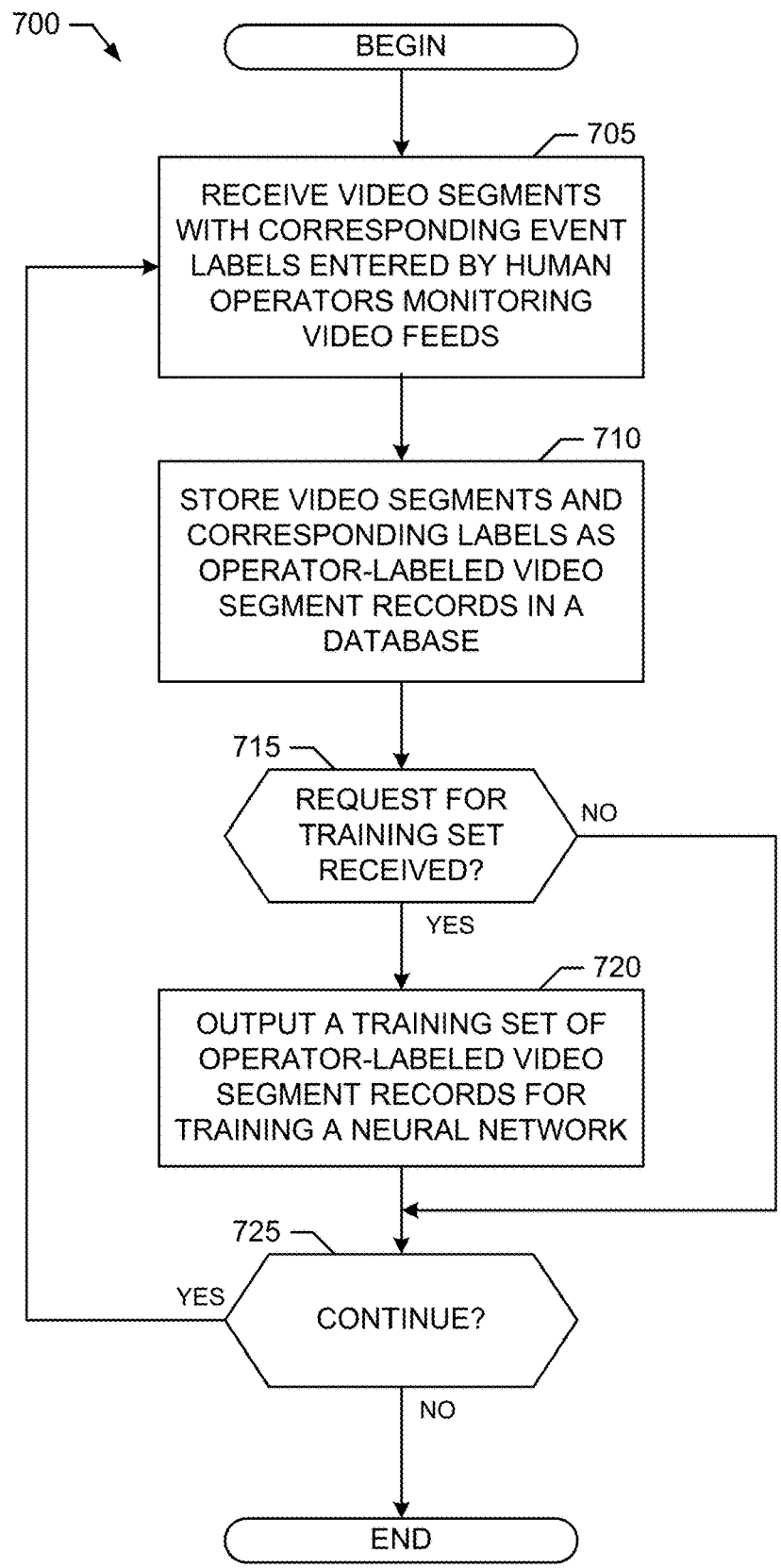

An example program 700 that may be executed to implement the example database 210 included in the example video surveillance systems 200, 300 and 400 of FIGS. 2-4, and/or to perform processing at block 605 of FIG. 6, is illustrated in FIG. 7. For convenience, and without loss of generality, execution of the example program 700 is described from the perspective of the example database 210 operating in the example video surveillance system 400 of FIG. 4. With reference to the preceding figures and associated written descriptions, the example program 700 of FIG. 7 begins execution at block 705 at which the database 210 receives, as described above, monitored video segments and corresponding event labels from the monitoring stations 115A-B via the network 110. As described above, the event labels reflect decisions entered by human operators concerning whether an event of interest is depicted or otherwise represented in the corresponding monitored video segments. At block 710, the database 210 creates, as described above, the records 220 of the operator-labeled video segments from the received video segments and the corresponding event labels received at block 705, and stores the records 220 in the example record storage 225 of the database 210.

At block 715, the database 210 determines whether a request for a set of training data has been received from the neural network 205. As described above, in some examples, the request includes a number of the records 220 being requested for inclusion in the set of training data. In some examples, the request additionally or alternatively includes the type of event to be depicted or otherwise represented by the records 220 to be included in the set of training data. If a request for training data is received (block 715), the database 210 retrieves a training set of records 220 from the record storage 225 that satisfies the request, and outputs the training set of records 220 to the neural network 205 (e.g., via the network 110) to facilitate training of the neural network.

Figure 8:
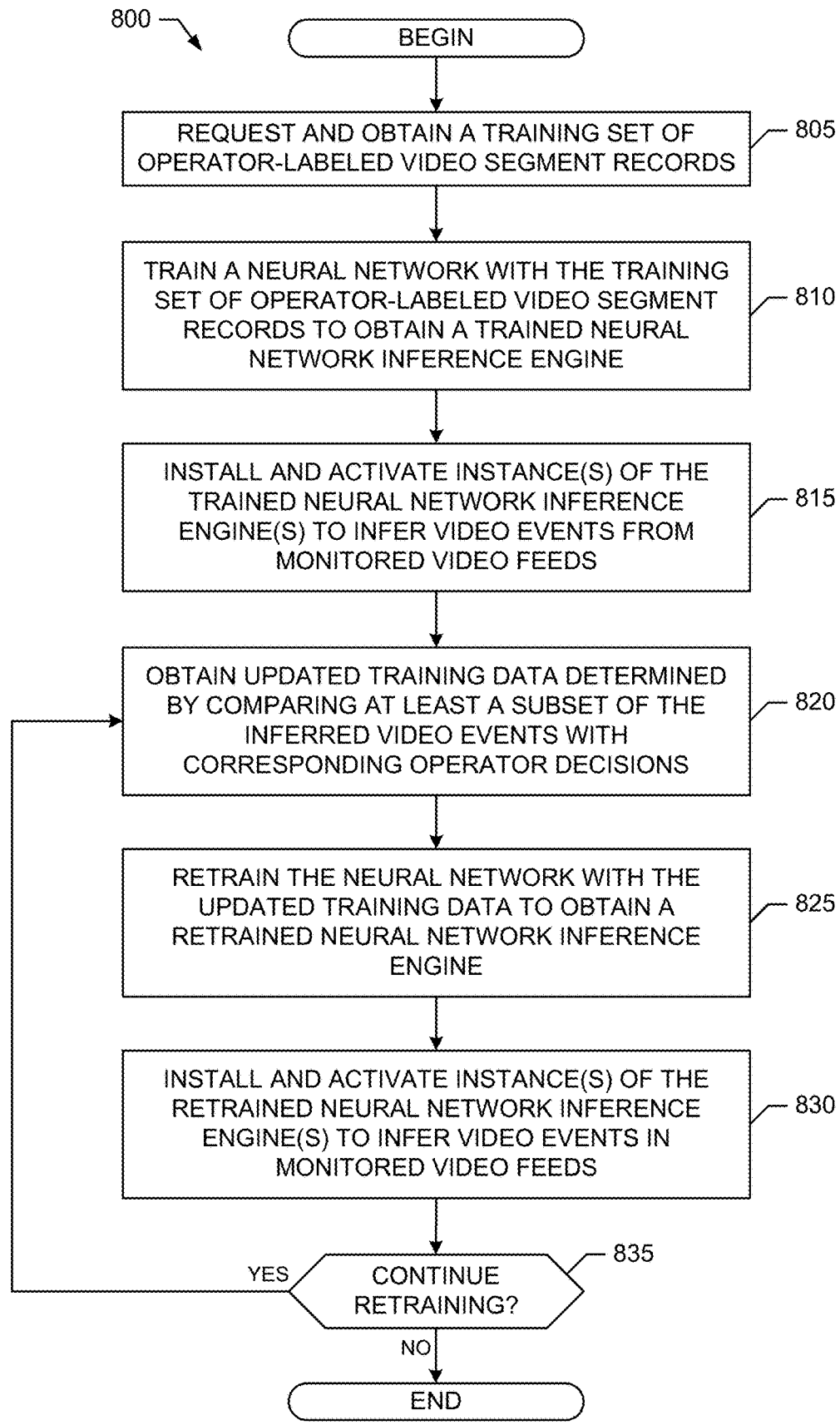

An example program 800 that may be executed to implement the example neural network 205 included in the example video surveillance systems 200, 300 and 400 of FIGS. 2-4, and/or to perform processing at blocks 610 and 615 of FIG. 6, is illustrated in FIG. 8. For convenience, and without loss of generality, execution of the example program 800 is described from the perspective of the example neural network 205 operating in the example video surveillance system 400 of FIG. 4. With reference to the preceding figures and associated written descriptions, the example program 800 of FIG. 8 begins execution at block 805 at which the example training data retriever 250 of the neural network 205 requests and obtains a set of training records 220 of operator-labeled video segments from the database 210. As described above, in some examples, the request includes a number of the records 220 being requested for inclusion in the set of training data. In some examples, the request additionally or alternatively includes the type of event to be depicted or otherwise represented by the records 220 to be included in the set of training data.

At block 810, the example training engine 240 and the example comparator 245 train, as described above, the example inference engine 230 of the neural network 205 using the obtained training set of records 220 to infer events from the reference video segments included in the training set of records 220. At block 815, the example deployer 305 of the neural network 205 deploys, as described above, instances of the trained inference engine 230 to one or more target monitoring location to infer events from monitored video feeds. For example, at block 815, the deployer 305 may deploy the example instances 310A-B of the trained inference engine 230 for execution by, or in conjunction with, the example monitoring stations 105A-B. Additionally or alternatively, in some examples, the deployer 305 may deploy the example instances 410A-B of the trained inference engine 230 to monitoring locations to perform video surveillance monitoring independently from the monitoring stations 105A-B.

At block 820, the neural network 205 obtains (e.g., via the network 110) updated training data determined by one or more of the monitoring stations 105A-B executing, or operating in conjunction with, the instances 310A-B of the trained inference engine 230. For example, and as described above, the monitoring stations 105A-B may compare inferred events output by the instances 310A-B of the trained inference engine 230 for corresponding monitored video segments with respective operator event labels generated by the monitoring station 115A-B from operator decisions entered by the human operators 130A-B for the corresponding monitored video segments to determine the updated training data. At block 825, the neural network retrains its first, or reference, instance of the inference engine 230 using the updated training data, as described above. At block 830, the deployer 305 redeploys instances of the retrained inference engine 230 to one or more of the target monitoring locations, as described above. At block 835, the neural network 205 determines whether retraining of its inference engine 230 is to continue. If retraining is to continue, processing returns to block 820 and blocks subsequent thereto to enable the neural network 205 to continue retraining of its inference engine 230 based on updated training data received from the monitoring stations 105A-B.

Figure 9:
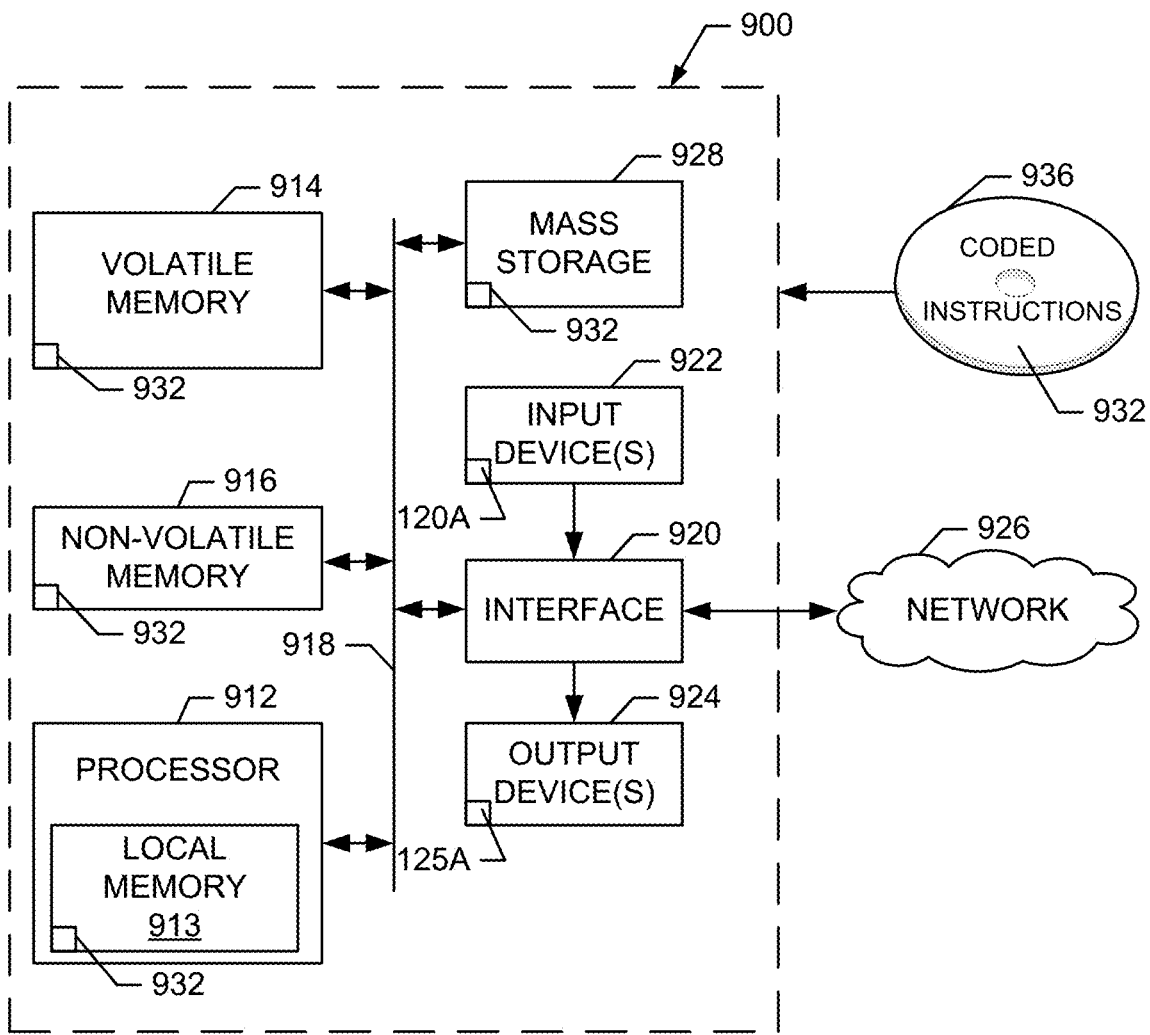
FIG. 9 is a block diagram of an example processor platform structured to execute example machine readable instructions from one or more of FIGS. 5-8 to implement an example monitoring station included in the example video surveillance systems of FIGS. 2-4.

FIG. 9 is a block diagram of an example processor platform 900 structured to execute the instructions of FIGS. 5, 6, 7 and/or 8 to implement the example monitoring stations 115A-B of FIGS. 1-4. For convenience and without loss of generality, the example processor platform 900 is described from the perspective of implementing the example monitoring station 115A. The processor platform 900 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition. In some examples, the input data device(s) 922 implement the example monitoring interface 125A.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor. In some examples, the output devices 924 implement the example display 120A.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.), such as the example network 110.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives.

Coded instructions 932 corresponding to the instructions of FIGS. 5, 6, 7 and/or 8 may be stored in the mass storage device 928, in the volatile memory 914, in the non-volatile memory 916, in the local memory 913 and/or on a removable tangible computer readable storage medium, such as a CD or DVD 936.

Figure 10:
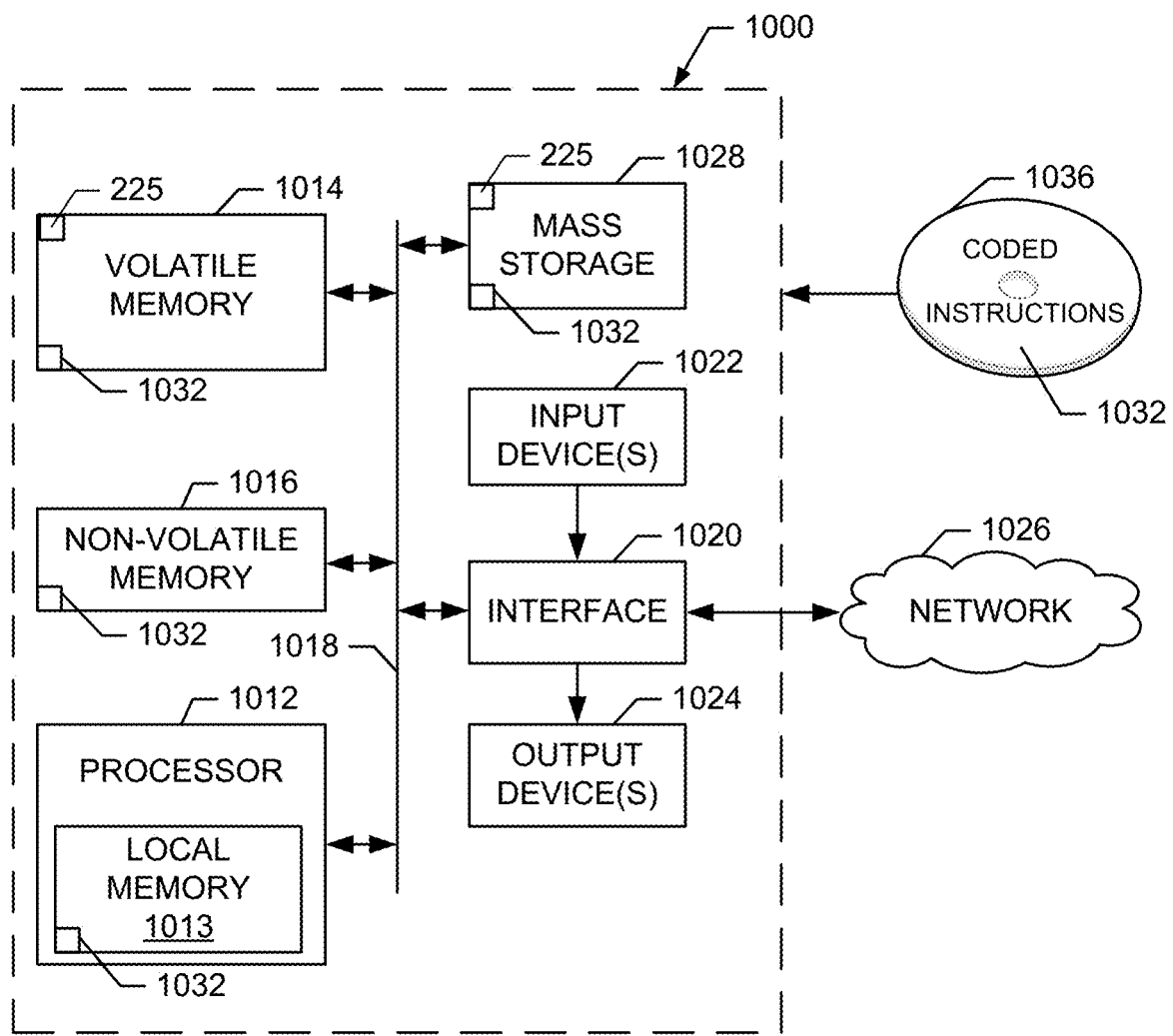
FIG. 10 is a block diagram of an example processor platform structured to execute example machine readable instructions from one or more of FIGS. 5-8 to implement an example database included in the example video surveillance systems of FIGS. 2-4.

FIG. 10 is a block diagram of an example processor platform 1000 structured to execute the instructions of FIGS. 5, 6, 7 and/or 8 to implement the example database 210 of FIGS. 2-4. The processor platform 1000 can be, for example, a server, a personal computer, a mobile device (e.g., a cell phone, a smart phone, a tablet such as an iPad™), a PDA, an Internet appliance, etc., or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor 1012 may be a semiconductor based (e.g., silicon based) device.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by SDRAM, DRAM, RDRAM and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., an LED, an OLED, a liquid crystal display, a CRT display, a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a DSL, a telephone line, coaxial cable, a cellular telephone system, etc.), such as the example network 110.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives. In some examples, the mass storage devices 1028 may implement the example record storage 225. Additionally or alternatively, in some examples the volatile memory 1014 may implement the example record storage 225.

Coded instructions 1032 corresponding to the instructions of FIGS. 5, 6, 7 and/or 8 may be stored in the mass storage device 1028, in the volatile memory 1014, in the non-volatile memory 1016, in the local memory 1013 and/or on a removable tangible computer readable storage medium, such as a CD or DVD 1036.

Figure 11:
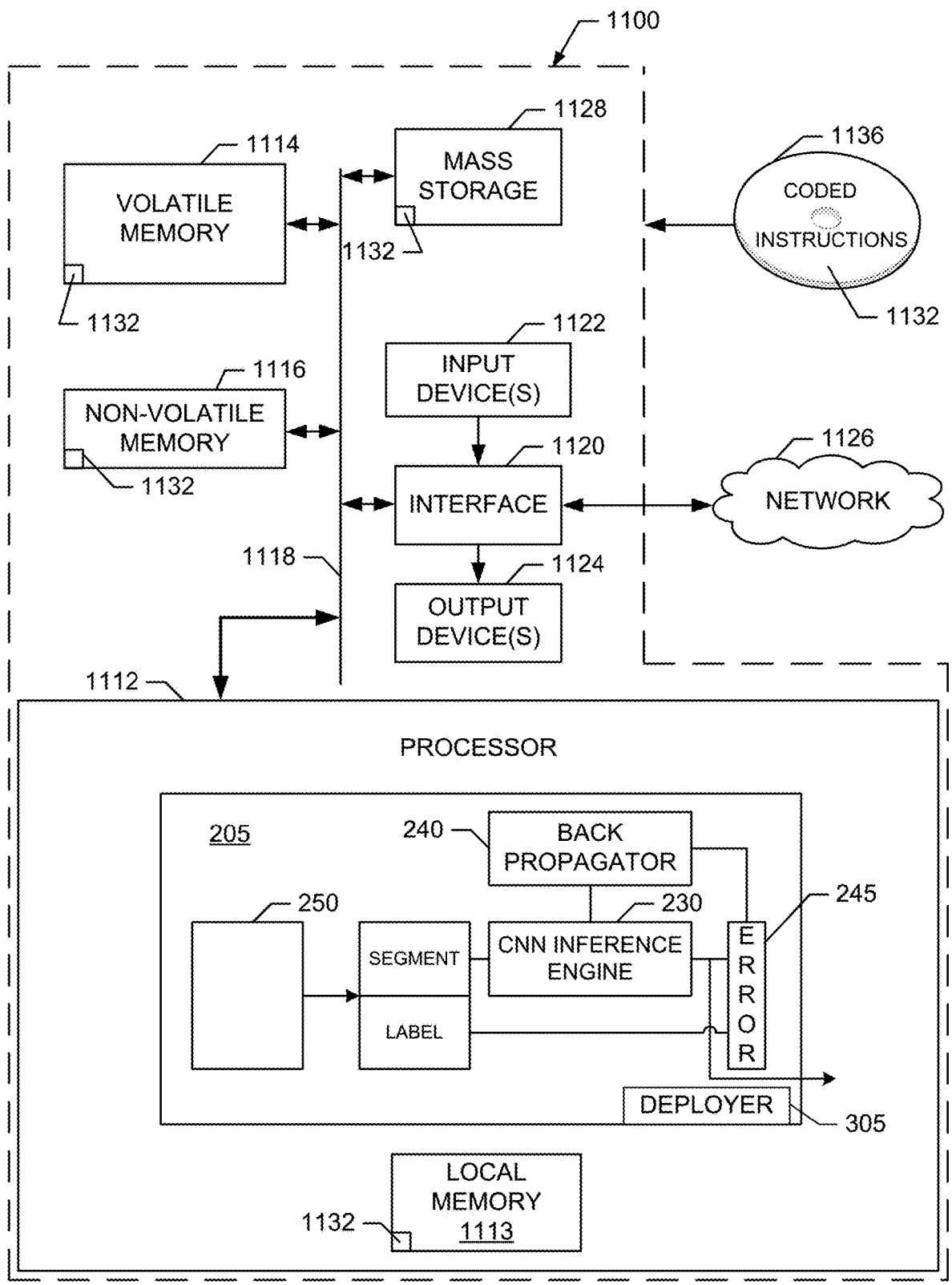
FIG. 11 is a block diagram of an example processor platform structured to execute example machine readable instructions from one or more of FIGS. 5-8 to implement an example neural network included in the example video surveillance systems of FIGS. 2-4.

FIG. 11 is a block diagram of an example processor platform 1100 structured to execute the instructions of FIGS. 5, 6, 7 and/or 8 to implement the example neural network 205 of FIGS. 2-4. The processor platform 1100 can be, for example, a server, a personal computer, a mobile device (e.g., a cell phone, a smart phone, a tablet such as an iPad™), a PDA, an Internet appliance, etc., or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor 1112 may be a semiconductor based (e.g., silicon based) device. In this example, the processor 1112 implements the example inference engine 230, the example training engine 240, the example comparator 245, the example training data retriever 250 and/or the example deployer 305.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by SDRAM, DRAM, RDRAM and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., an LED, an OLED, a liquid crystal display, a CRT display, a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a DSL, a telephone line, coaxial cable, a cellular telephone system, etc.), such as the example network 110.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives.

Coded instructions 1132 corresponding to the instructions of FIGS. 5, 6, 7 and/or 8 may be stored in the mass storage device 1128, in the volatile memory 1114, in the non-volatile memory 1116, in the local memory 1113 and/or on a removable tangible computer readable storage medium, such as a CD or DVD 1136.

The foregoing disclosure provides examples of video surveillance with neural networks. The following further examples, which include subject matter such as a video surveillance system to implement video surveillance with a neural network, at least one computer-readable storage medium including instructions that, when executed by at least one processor, cause the at least one processor to implement video surveillance with a neural network, means for implementing video surveillance with a neural network, and a video surveillance method to perform video surveillance with a neural network, are disclosed herein. The disclosed examples can be implemented individually and/or in one or more combinations.

From the foregoing, it will be appreciated that example methods, apparatus, systems and articles of manufacture (e.g., physical storage media) to implement video surveillance with neural networks have been disclosed herein. Disclosed examples include neural networks having inference engines that are trained to detect, or infer, events in monitored video feeds. The neural network inference engines are trained using a training set of reference video segments with reference event labels indicating whether the reference video segments depict defined events. The trained inference engines are then deployed to one or more monitoring locations and operate (e.g., in parallel, asynchronously, in cooperation, etc.) to infer whether one or more trained events (e.g., such as a security violation, presence of an individual, arrival of a package, etc.) are represented in the corresponding video feeds they monitor. In some examples, the instances of the trained/retrained inference engines can be deployed to unmanned monitoring locations, or to provide additional capacity at manned locations, thereby allowing the capacity of the video surveillance system to readily scale as demand increases.

The foregoing disclosure provides examples of implementing video surveillance with neural networks. Further examples of implementing video surveillance with neural networks are disclosed hereinbelow. The disclosed examples can be implemented individually and/or in one or more combinations.

Example 1 is a video surveillance system including a database to store operator-labeled video segments, the operator-labeled video segments including reference video segments and corresponding reference event labels to describe the reference video segments. The system of example 1 also includes a neural network including a first instance of an inference engine, and a training engine to train the first instance of the inference engine based on a training set of the operator-labeled video segments obtained from the database, the first instance of the inference engine to infer events from the operator-labeled video segments included in the training set. The system of example 1 further includes a second instance of the inference engine to infer events from monitored video feeds, the second instance of the inference engine being based on the first instance of the inference engine.

Example 2 includes the subject matter of example 1, wherein the reference event labels indicate whether the corresponding reference video segments depict a defined event.

Example 3 includes the subject matter of examples 1 and/or 2, wherein a first one of the reference event labels corresponding to a first one of the reference video segments indicates (i) a type of event and (ii) whether the first one of the reference video segments depicts the type of event.

Example 4 includes the subject matter of one or more of examples 1 to 3, and further includes a monitoring station, which includes a display to present a first one of the monitored video feeds, and a monitoring interface to generate operator event labels based on operator decisions corresponding to monitored video segments of the first one of the monitored video feeds.

Example 5 includes the subject matter of example 4, wherein the database is in communication with the monitoring station to receive a first one of the monitored video segments and a first one of the operator event labels corresponding to the first one of the monitored video segments, the database to store the first one of the monitored video segments and the corresponding first one of the operator event labels as a first one of the reference video segments and a corresponding first one of the reference event labels included in a first one of the operator-labeled video segments.

Example 6 includes the subject matter of example 5, wherein the monitoring station is further to implement the second instance of the inference engine.

Example 7 includes the subject matter of example 6, wherein the second instance of the inference engine is to output an inferred event for a second one of monitored video segments of the first one of the monitored video feeds, the monitoring interface is to generate a second one of the operator event labels from an operator decision detected for the second one of monitored video segments, and the monitoring station further includes a comparator to compare the inferred event and the second one of the operator event labels to obtain updated training data.

Example 8 includes the subject matter of example 7, wherein the neural network is in communication with the monitoring station to receive the updated training data, and the training engine is to retrain the first instance of the inference engine based on the updated training data.

Example 9 includes at least one non-transitory computer readable storage media including computer readable instructions which, when executed, cause one or more processors to at least train a first instance of an inference engine based on a training set of operator-labeled video segments, the operator-labeled video segments including reference video segments and corresponding reference event labels to describe the reference video segments, the first instance of the inference engine to infer events from the operator-labeled video segments included in the training set; and deploy a second instance of the inference engine to infer events from monitored video feeds, the second instance of the inference engine being based on the first instance of the inference engine.

Example 10 includes the subject matter of example 9, wherein the reference event labels indicate whether the corresponding reference video segments depict a defined event.

Example 11 includes the subject matter of example 9 and/or 10, wherein a first one of the reference event labels corresponding to a first one of the reference video segments indicates (i) a type of event and (ii) whether the first one of the reference video segments depicts the type of event.

Example 12 includes the subject matter of one or more of examples 9 to 11, wherein the computer readable instructions, when executed, cause the one or more processors to obtain a first one of the reference video segments and a corresponding first one of the reference event labels from a monitoring station.

Example 13 includes the subject matter of example 12, wherein the computer readable instructions, when executed, cause the one or more processors to deploy the second instance of the inference engine to the monitoring station.

Example 14 includes the subject matter of example 13, wherein the second instance of the inference engine is a duplicate of the first instance of the inference engine when the second instance of the inference engine is initially deployed to the monitoring station.

Example 15 includes the subject matter of example 13, wherein the monitoring station is to obtain updated training data by comparing (i) inferred events output by the second instance of the inference engine for segments of the monitored video feeds with (ii) operator event labels generated by the monitoring station for the segments of the monitored video feeds, and the computer readable instructions, when executed, further cause the one or more processors to retrain the first instance of the inference engine based on the updated training data.

Example 16 is an apparatus including means for obtaining operator-labeled video segments, the operator-labeled video segments including reference video segments and corresponding reference event labels to describe the reference video segments. The apparatus of example 16 also includes means for training a first instance of an inference engine based on a training set of the operator-labeled video segments, the first instance of the inference engine to infer events from the operator-labeled video segments included in the training set. The apparatus of example 16 further includes means for deploying a second instance of the inference engine to infer events from monitored video feeds, the second instance of the inference engine being based on the first instance of the inference engine.

Example 17 includes the subject matter of example 16, wherein the reference event labels indicate whether the corresponding reference video segments depict a defined event.

Example 18 includes the subject matter of examples 16 and/or 17, wherein a first one of the reference event labels corresponding to a first one of the reference video segments indicates (i) a type of event and (ii) whether the first one of the reference video segments depicts the type of event.

Example 19 includes the subject matter of one or more of examples 16 to 18, wherein the means for obtaining the records of operator-labeled video segments is to obtain a first one of the reference video segments and a corresponding first one of the reference event labels from a monitoring station.

Example 20 includes the subject matter of example 19, wherein the means for deploying the second instance of the inference engine is to deploy the second instance of the inference engine to the monitoring station.

Example 21 includes the subject matter of example 20, wherein the second instance of the inference engine is a duplicate of the first instance of the inference engine when the second instance of the inference engine is initially deployed to the monitoring station.

Example 22 includes the subject matter of example 20, wherein the monitoring station is to obtain updated training data by comparing (i) inferred events output by the second instance of the inference engine for segments of the monitored video feeds with (ii) operator event labels generated by the monitoring station for the segments of the monitored video feeds, and the means for training the first instance of the inference engine is further to retrain the first instance of the inference engine based on the updated training data.

Example 23 is a video surveillance method including training, by executing an instruction with at least one processor, a first instance of an inference engine based on a training set of operator-labeled video segments, the operator-labeled video segments including reference video segments and corresponding reference event labels to describe the reference video segments, the first instance of the inference engine to infer events from the operator-labeled video segments included in the training set. The video surveillance method of example 23 also includes deploying, by executing an instruction with the at least one processor, a second instance of the inference engine to infer events from monitored video feeds, the second instance of the inference engine being based on the first instance of the inference engine.

Example 24 includes the subject matter of example 23, wherein the reference event labels indicate whether the corresponding reference video segments depict a defined event.

Example 25 includes the subject matter of examples 23 and/or 24, wherein a first one of the reference event labels corresponding to a first one of the reference video segments indicates (i) a type of event and (ii) whether the first one of the reference video segments depicts the type of event.

Example 26 includes the subject matter of one or more of examples 23 to 25, wherein the accessing of the records of operator-labeled video segments includes obtaining a first one of the reference video segments and a corresponding first one of the reference event labels from a monitoring station.

Example 27 includes the subject matter of example 26, wherein the deploying of the second instance of the inference engine includes deploying the second instance of the inference engine to the monitoring station.

Example 28 includes the subject matter of example 27, wherein the second instance of the inference engine is a duplicate of the first instance of the inference engine when the second instance of the inference engine is initially deployed to the monitoring station.

Example 29 includes the subject matter of example 27, wherein the monitoring station is to obtain updated training data by comparing (i) inferred events output by the second instance of the inference engine for segments of the monitored video feeds with (ii) operator event labels generated by the monitoring station for the segments of the monitored video feeds, and the training of the first instance of the inference engine further includes retraining the first instance of the inference engine based on the updated training data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. At least one non-transitory computer readable medium comprising computer readable instructions to cause one or more processors to at least:
provide access to a first group of video segments to be labeled by a first group of one or more humans to identify events depicted in the first group of video segments, and provide access to a second group of video segments to be labeled by a second group of one or more humans to identify events depicted in the second group of video segments, the second group of one or more humans to be different from the first group of one or more humans;
train a machine learning model based on a training dataset to generate a trained machine learning model, the training dataset including the first group of video segments, the second group of video segments and first labels;
deploy the trained machine learning model to a first device that is to execute the trained machine learning model to process video data from an imaging sensor;
obtain additional training data based on a comparison of second labels with output data from the trained machine learning model deployed to the first device, the second labels based on human evaluation of input data, the input data processed by the trained machine learning model to generate the output data;

retrain the machine learning model in response to availability of at least a threshold amount of additional training data obtained based on respective output data generated by a plurality of devices which respectively executed the trained machine learning model, the plurality of devices including the first device; and deploy the retrained machine learning model to a second device different from the plurality of devices.

2. The at least one non-transitory computer readable medium of claim 1, wherein the machine learning model corresponds to a neural network.

3. The at least one non-transitory computer readable medium of claim 1, wherein the instructions are to cause at least one of the one or more processors to retrain the machine learning model in response to an event.

4. The at least one non-transitory computer readable medium of claim 1, wherein the instructions are to cause at least one of the one or more processors to retrain the machine learning model periodically.

5. The at least one non-transitory computer readable medium of claim 1, wherein the imaging sensor is implemented by at least one of a camera, a smartphone, a photodiode, or a light detector.

6. The at least one non-transitory computer readable medium of claim 1, wherein the second group of video segments is to be different from the first group of video segments.

7. A system comprising:
a least one memory;
machine readable instructions; and
one or more compute devices including processor circuitry to execute the machine readable instructions to at least:
train a machine learning model based on a training dataset to generate a trained machine learning model, the training dataset including a first group of video segments, a second group of video segments and first labels associated with the first group of video segments and the second group of video segments, the first group of video segments labeled by a first group of one or more humans to identify events depicted in the first group of video segments, the second group of video segments labeled by a second group of one or more humans to identify events depicted in the second group of video segments, the second group of one or more humans to be different from the first group of one or more humans;
deploy the trained machine learning model to a first device that is to execute the trained machine learning model to process video data from an imaging sensor;
obtain a result of a comparison of second labels with output data from the trained machine learning model deployed to the first device, the second labels based on human evaluation of input data, the input data processed by the trained machine learning model to generate the output data;
retrain the machine learning model in response to availability of at least a threshold amount of additional training data obtained based on respective output data generated by a plurality of devices which respectively executed the trained machine learning model, the plurality of devices including the first device; and
deploy the retrained machine learning model to a second device different from the plurality of devices.

8. The system of claim 7, wherein the machine learning model corresponds to a neural network.

9. The system of claim 7, wherein at least one of the one or more compute devices is to retrain the machine learning model in response to an event.

10. The system of claim 7, wherein at least one of the one or more compute devices is to retrain the machine learning model periodically.

11. The system of claim 7, wherein the imaging sensor is implemented by at least one of a camera, a smartphone, a photodiode, or a light detector.

12. The system of claim 7, wherein the second group of video segments is to be different from the first group of video segments.

13. A method comprising:
accessing a first group of video segments to be labeled by a first group of one or more humans to identify events depicted in the first group of video segments, and accessing a second group of video segments to be labeled by a second group of one or more humans to identify events depicted in the second group of video segments, the second group of one or more humans to be different from the first group of one or more humans;
training, by executing an instruction with at least one processor circuit a machine learning model based on a training dataset to generate a trained machine learning model, the training dataset including the first group of video segments, the second group of video segments and first labels;
deploying the trained machine learning model to a first device that is to execute the trained machine learning model to process video data from an imaging sensor;
obtaining, by executing an instruction with at least one of the at least one processor circuit, additional training data based on a comparison of second labels with output data from the trained machine learning model deployed to the first device, the second labels based on human evaluation of input data, the input data processed by the trained machine learning model to generate the output data;
retraining, by executing an instruction with at least one of the at least one processor circuit the machine learning model in response to availability of at least a threshold amount of additional training data obtained based on respective output data generated by execution of the trained machine learning model by a plurality of devices, the plurality of devices including the first device; and
deploying the retrained machine learning model to a second device different from the plurality of devices.

14. The method of claim 13, wherein the machine learning model corresponds to a neural network.

15. The method of claim 13, wherein the retraining of the machine learning model is in response to an event.

16. The method of claim 13, wherein the retraining of the machine learning model is performed periodically.

17. The method of claim 13, wherein the imaging sensor is implemented by at least one of a camera, a smartphone, a photodiode, or a light detector.

18. The method of claim 13, wherein the second group of video segments is different from the first group of video segments.

19. An apparatus comprising:
a least one memory;
machine readable instructions; and
at least one processor circuit to execute the machine readable instructions to at least:
access a first group of video segments labeled by a first group of one or more humans to identify events depicted in the first group of video segments, and access a second group of video segments labeled by a second group of one or more humans to identify events depicted in the second group of video segments, the second group of one or more humans different from the first group of one or more humans;

train a machine learning model based on a training dataset to generate a trained machine learning model, the training dataset including the first group of video segments, the second group of video segments and first labels;

deploy the trained machine learning model to a first device that is to execute the trained machine learning model to process video data from an imaging sensor;

obtain additional training data based on a comparison of second labels with output data from the trained machine learning model deployed to the first device, the second labels based on human evaluation of input data, the input data processed by the trained machine learning model to generate the output data;

retrain the machine learning model in response to availability of at least a threshold amount of additional training data obtained based on respective output data generated via respective execution of the trained machine learning model by a plurality of devices, the plurality of devices including the first device; and deploy the retrained machine learning model to a second device different from the plurality of devices.

20. The apparatus of claim 19, wherein the imaging sensor is implemented by at least one of a camera, a smartphone, a photodiode, or a light detector.

21. The apparatus of claim 19, wherein the second group of video segments is different from the first group of video segments.

* * * * *